(12) United States Patent
Rymarz

(10) Patent No.: US 8,599,143 B1
(45) Date of Patent: Dec. 3, 2013

(54) SWITCH CONFIGURATION FOR DETECTING WRITING PRESSURE IN A WRITING DEVICE

(75) Inventor: Paul Rymarz, Pleasanton, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 1488 days.

(21) Appl. No.: 11/348,804

(22) Filed: Feb. 6, 2006

(51) Int. Cl.
*G09G 5/00* (2006.01)

(52) U.S. Cl.
USPC .......................................... 345/173; 345/156

(58) Field of Classification Search
USPC .................................. 345/173–179, 184, 156
See application file for complete search history.

(56) References Cited

U.S. PATENT DOCUMENTS

| | | |
|---|---|---|
| 2,182,334 A | 12/1939 | Crespo |
| 2,932,907 A | 4/1960 | Stieber et al. |
| 3,292,489 A | 12/1966 | Johnson et al. |
| 3,304,612 A | 2/1967 | Proctor et al. |
| 3,530,241 A | 9/1970 | Ellis et al. |
| 3,591,718 A | 7/1971 | Asano et al. |
| 3,798,370 A | 3/1974 | Hurst |
| 3,888,311 A | 6/1975 | Cooke, Jr. |
| 3,911,215 A | 10/1975 | Hurst et al. |
| 3,921,165 A | 11/1975 | Dym |
| 4,079,194 A | 3/1978 | Kley |
| 4,220,815 A | 9/1980 | Gibson et al. |
| 4,425,099 A | 1/1984 | Naden |
| 4,492,819 A | 1/1985 | Rodgers et al. |
| 4,570,149 A | 2/1986 | Thornburg et al. |
| 4,603,231 A | 7/1986 | Reiffel et al. |
| 4,619,539 A * | 10/1986 | Kageyama ...................... 401/85 |
| 4,630,209 A | 12/1986 | Saito et al. |
| 4,650,926 A | 3/1987 | Nakamura et al. |
| 4,706,090 A | 11/1987 | Hashiguchi et al. |
| 4,739,299 A | 4/1988 | Eventoff et al. |
| 4,787,040 A * | 11/1988 | Ames et al. ...................... 701/1 |
| 4,839,634 A | 6/1989 | More et al. |
| 4,853,494 A | 8/1989 | Suzuki |
| 4,853,498 A | 8/1989 | Meadows et al. |
| 4,853,499 A | 8/1989 | Watson |
| 4,913,463 A | 4/1990 | Tlapek et al. |
| 4,922,061 A | 5/1990 | Meadows et al. |
| 5,030,117 A | 7/1991 | Delorme |

(Continued)

FOREIGN PATENT DOCUMENTS

| | | |
|---|---|---|
| CN | 1655184 A | 8/2005 |
| EP | 539053 | 4/1993 |

(Continued)

OTHER PUBLICATIONS

Steve Silberman, "The Hot New Medium: Paper", Apr. 2001, Wired, Issue 9.04.

(Continued)

*Primary Examiner* — Alexander Eisen
*Assistant Examiner* — Nelson Lam

(57) ABSTRACT

An apparatus for detecting writing pressure is comprised of a carrier. A mode selection device coupled to the carrier is operable to select writing modes. A switch coupled to the carrier is operable to move between a first state and a second state in response to writing pressure coupled to the switch. An actuator coupled to the carrier is configured to actuate the switch in response to pressure applied to the actuator in response to writing.

9 Claims, 14 Drawing Sheets

(56) References Cited

U.S. PATENT DOCUMENTS

| | | | |
|---|---|---|---|
| 5,053,585 A | 10/1991 | Yaniger | |
| 5,057,024 A | 10/1991 | Sprott et al. | |
| 5,113,178 A | 5/1992 | Yasuda et al. | |
| 5,149,919 A | 9/1992 | Greanias et al. | |
| 5,159,321 A | 10/1992 | Masaki et al. | |
| 5,217,376 A | 6/1993 | Gosselin | |
| 5,217,378 A | 6/1993 | Donovan | |
| 5,220,136 A | 6/1993 | Kent | |
| 5,220,649 A | 6/1993 | Forcier | |
| 5,313,051 A | 5/1994 | Brigida et al. | |
| 5,401,916 A | 3/1995 | Crooks | |
| 5,417,575 A | 5/1995 | McTaggart | |
| 5,438,168 A | 8/1995 | Wolfe et al. | |
| 5,484,292 A | 1/1996 | McTaggart | |
| 5,575,659 A | 11/1996 | King et al. | |
| 5,627,349 A | 5/1997 | Shetye et al. | |
| 5,636,995 A | 6/1997 | Sharpe et al. | |
| 5,652,412 A | 7/1997 | Lazzouni et al. | |
| 5,686,705 A | 11/1997 | Conroy et al. | |
| 5,698,822 A | 12/1997 | Haneda et al. | |
| 5,717,939 A | 2/1998 | Bricklin et al. | |
| 5,760,773 A | 6/1998 | Berman et al. | |
| 5,835,726 A | 11/1998 | Shwed et al. | |
| 5,844,483 A | 12/1998 | Boley | |
| 5,847,698 A | 12/1998 | Reavey et al. | |
| 5,889,506 A | 3/1999 | Lopresti et al. | |
| 5,963,199 A | 10/1999 | Kato | |
| 5,992,817 A | 11/1999 | Klitsner et al. | |
| 6,020,895 A | 2/2000 | Azami | |
| 6,094,197 A | 7/2000 | Buxton et al. | |
| 6,100,877 A | 8/2000 | Chery et al. | |
| 6,104,387 A | 8/2000 | Chery et al. | |
| 6,104,388 A * | 8/2000 | Nagai et al. | 345/179 |
| 6,130,666 A * | 10/2000 | Persidsky | 345/179 |
| 6,144,371 A | 11/2000 | Clary et al. | |
| 6,215,476 B1 | 4/2001 | Depew et al. | |
| 6,239,792 B1 | 5/2001 | Yanagisawa et al. | |
| 6,275,301 B1 | 8/2001 | Bobrow et al. | |
| 6,304,667 B1 | 10/2001 | Reitano | |
| 6,313,828 B1 | 11/2001 | Chombo | |
| 6,396,481 B1 | 5/2002 | Challa et al. | |
| 6,418,326 B1 | 7/2002 | Heinonen et al. | |
| 6,431,439 B1 | 8/2002 | Suer et al. | |
| 6,441,807 B1 | 8/2002 | Yamaguchi | |
| 6,529,920 B1 | 3/2003 | Arons et al. | |
| 6,577,299 B1 * | 6/2003 | Schiller et al. | 345/179 |
| 6,584,249 B1 | 6/2003 | Gu et al. | |
| 6,641,401 B2 | 11/2003 | Wood et al. | |
| 6,663,008 B1 | 12/2003 | Pettersson et al. | |
| 6,689,966 B2 | 2/2004 | Wiebe | |
| 6,798,403 B2 | 9/2004 | Kitada et al. | |
| 6,847,883 B1 | 1/2005 | Walmsley et al. | |
| 6,874,883 B1 | 4/2005 | Shigemura et al. | |
| 6,947,027 B2 | 9/2005 | Lapstun et al. | |
| 6,965,454 B1 | 11/2005 | Silverbrook et al. | |
| 6,985,138 B2 * | 1/2006 | Charlier | 345/179 |
| 6,989,816 B1 | 1/2006 | Dougherty et al. | |
| 7,134,606 B2 | 11/2006 | Chou | |
| 7,193,618 B2 * | 3/2007 | Morehouse | 345/179 |
| 7,206,737 B2 | 4/2007 | Seto | |
| 7,239,306 B2 * | 7/2007 | Fahraeus et al. | 345/179 |
| 7,289,110 B2 | 10/2007 | Hansson | |
| 7,409,089 B2 | 8/2008 | Simmons et al. | |
| 7,421,439 B2 | 9/2008 | Wang et al. | |
| 7,453,447 B2 | 11/2008 | Marggraff et al. | |
| 2001/0015721 A1 | 8/2001 | Byun et al. | |
| 2002/0044134 A1 | 4/2002 | Ericson et al. | |
| 2002/0060665 A1 * | 5/2002 | Sekiguchi et al. | 345/157 |
| 2002/0077902 A1 | 6/2002 | Marcus | |
| 2002/0120854 A1 | 8/2002 | Levine et al. | |
| 2003/0014615 A1 | 1/2003 | Lynggaard | |
| 2003/0016212 A1 | 1/2003 | Lynggaard | |
| 2003/0028451 A1 | 2/2003 | Ananian | |
| 2003/0133164 A1 | 7/2003 | Tsai | |
| 2003/0173405 A1 | 9/2003 | Wilz et al. | |
| 2003/0208410 A1 | 11/2003 | Silverbrook et al. | |
| 2004/0202987 A1 | 10/2004 | Scheuring et al. | |
| 2004/0219501 A1 | 11/2004 | Small et al. | |
| 2004/0259067 A1 | 12/2004 | Cody et al. | |
| 2005/0002053 A1 | 1/2005 | Meador et al. | |
| 2005/0013487 A1 | 1/2005 | Clary et al. | |
| 2005/0022130 A1 | 1/2005 | Fabritius | |
| 2005/0060644 A1 | 3/2005 | Patterson et al. | |
| 2005/0083316 A1 * | 4/2005 | Brian et al. | 345/179 |
| 2005/0131803 A1 | 6/2005 | Lapstun et al. | |
| 2005/0135678 A1 | 6/2005 | Wecker et al. | |
| 2005/0138541 A1 | 6/2005 | Euchner et al. | |
| 2005/0165663 A1 | 7/2005 | Razumov | |
| 2005/0188306 A1 | 8/2005 | Mackenzie | |
| 2005/0211783 A1 | 9/2005 | Chou | |
| 2006/0126105 A1 | 6/2006 | Sedky et al. | |
| 2006/0146029 A1 | 7/2006 | Diercks et al. | |
| 2006/0159345 A1 | 7/2006 | Clary et al. | |
| 2006/0242562 A1 | 10/2006 | Wang et al. | |
| 2006/0291701 A1 | 12/2006 | Tanaka | |
| 2007/0003168 A1 * | 1/2007 | Oliver | 382/314 |

FOREIGN PATENT DOCUMENTS

| | | |
|---|---|---|
| EP | 1256090 | 11/2002 |
| EP | 1416426 | 5/2004 |
| EP | 1315085 | 5/2005 |
| GB | 2202664 | 9/1988 |
| JP | 57-238486 | 8/1980 |
| JP | 5137846 A | 6/1993 |
| JP | 5-217688 | 8/1993 |
| JP | 61-46516 | 5/1994 |
| KR | 2002009615 | 11/2000 |
| WO | 0072242 | 11/2000 |
| WO | 0183213 | 11/2001 |
| WO | 0183213 A1 | 11/2001 |
| WO | 2004084190 | 9/2004 |

OTHER PUBLICATIONS

"New Preschool Toys From Fisher-Price Give a Voice to Fun, Creativity and Interactive Play This Holiday Season", Mattel, Inc.: Investor Relations, http://www.shareholder.com/mattel/news/20000601-43282.cfm, 3pp., Jun. 2000.

"The Questron Electronic Wand;" 2 pages; Price, Stern, Sloan Publishers, Inc., Los Angeles, 1984.

British Micro, "Operating Guide to Grafpad", 1982, 28 pp.

Kramer, Translucent Patches-Dissolving Windows:, Nov. 2, 1994 Symposium on user interface software and technology, pp. 121-130, XP00197943.

Robertson G.G et al:, "Buttons As First Class Objects on an X Desktop", Nov. 11, 1991, UIST '91.4th Annual Symposium on user interface software and technology. Proceedings of the ACM Symposium on user interface and technology. Hilton Head, SC, Nov. 11-13, 1991, ACM symposium on user interface software and technology, New Yo, pp. 35-44, XP000315064.

Stifelman, Lisa J. Augmenting Real-World Objects: A Paper-Based Audio Notebook. 1993. Speech Research Group, MIT Media Laboratory, Cambridge MA.

The Tools of Progress. [Jun. 19, 2001] [Retrieved Jun. 19, 2001] [Retrieved from the Internet] <URL:http://www.anoto.com/print_page.asp?cid=22>.

Web page; "Sacn-A-Page or Word Lets Students Hear What They're Attempting to Read;" at URL=http://www.brighteye.com/home.htm; printed Mar. 13, 2003; 1 page.

Web page; "What Works; Optical Scanner Pens;" at URL=http://newsletters.fen.com/whatworks/item/front/0,2551,1-13751-3363,00.html; printed Mar. 13, 2003; 2 pages.

* cited by examiner

SWITCH CONFIGURATION FOR DETECTING WRITING PRESSURE IN A WRITING DEVICE

CROSS-REFERENCE TO RELATED APPLICATION

This Application is related to commonly-owned U.S. patent application Ser. No. 10/803,806, filed Mar. 17, 2004, by James Marggraff et al., entitled "SCANNING APPARATUS," and hereby incorporated by reference herein in its entirety.

This Application is related to commonly-owned U.S. patent application Ser. No. 10/861,243, filed Jun. 3, 2004, by James Marggraff et al., entitled "USER CREATED INTERACTIVE INTERFACE," and hereby incorporated by reference herein in its entirety.

This application is related to co-pending, commonly-owned U.S. patent application Ser. No. 11/034,491, filed Jan. 12, 2005, by James Marggraff et al., entitled "A METHOD AND SYSTEM FOR IMPLEMENTING A USER INTERFACE FOR A DEVICE EMPLOYING WRITTEN GRAPHICAL ELEMENTS," and hereby incorporated by reference herein in its entirety.

This application is related to co-pending, commonly-owned U.S. patent application Ser. No. 11/035,155, filed Jan. 12, 2005, by James Marggraff et al., entitled "A METHOD AND SYSTEM FOR IMPLEMENTING A USER INTERFACE FOR A DEVICE THROUGH RECOGNIZED TEXT AND BOUNDED AREAS," and hereby incorporated by reference herein in its entirety.

This application is related to co-pending, commonly-owned U.S. patent application Ser. No. 11/035,003, filed Jan. 12, 2005, by James Marggraff et al., entitled "TERMINATION EVENTS," and hereby incorporated herein in its entirety.

This application is related to co-pending, commonly-owned U.S. patent application Ser. No. 11/034,489, filed Jan. 12, 2005, by James Marggraff et al., entitled "PROVIDING A USER INTERFACE HAVING INTERACTIVE ELEMENTS ON A WRITABLE SURFACE," and hereby incorporated herein in its entirety.

This application is related to co-pending, commonly-owned U.S. patent application Ser. No. 11/348,803, filed, by Paul Rymarz, entitled "A WRITING INSERT FOR A PEN BASED COMPUTER," and hereby incorporated herein in its entirety.

FIELD OF INVENTION

Embodiments of the present invention relate to the field of interactive devices and pen based computing. More specifically, embodiments of the present invention relate to a switch configuration to detect writing pressure in an interactive writing device.

BACKGROUND OF THE INVENTION

In the last twenty years, the use of personal computing devices, such as desktop computer systems, laptop computer systems, handheld computers systems, and tablet computer systems, has grown tremendously. These personal computing devices provide users with a broad range of interactive applications, business utilities, communication abilities, and entertainment possibilities.

Current personal computing devices provide access to these interactive applications via a user interface. Typical computing devices have on-screen graphical interfaces that present information to a user using a display device, such as a monitor or display screen, and receive information from a user using an input device, such as a mouse, a keyboard, a joystick, or a stylus. New personal computing devices are also being developed which use an interactive writing device to interact and non-interactive writing devices to interact with a writing surface.

Many of these interactive writing devices have a need to detect the actual physical act of interfacing with the writing surface. One way current interactive writing devices accomplish this detection by utilizing an ink pen or stylus, to transmit pressure to a switch that is activated by writing pressure. This works well with styli, stick type pens, and some spring cushioned pens, because the entire length of the pen or stylus moves with the act of writing to apply direct pressure to the writing detection switch, and further, because there is no mode selector to interfere with the action of the writing detection switch. However, this limits the functionality of the writing device because such a switch configuration will not work properly, or sometimes at all, with a writing device such as a mechanical pencil or with a writing device that has multiple selectable modes of operation, because these devices can apply forces which defeat the operation of conventional writing sensing switch configurations.

SUMMARY OF THE INVENTION

A need exists for a switch configuration to detect writing pressure in a writing device, which can be used with writing devices having multiple modes of operation and also with writing devices such as mechanical pencils that will not function properly, or sometimes at all, with conventional switch configurations. Various embodiments of the present invention have the above-described advantages and others that are described herein.

In one embodiment, an apparatus for detecting writing pressure is comprised of a carrier. A mode selection device coupled to the carrier is operable to select writing modes. A switch coupled to the carrier is operable to move between a first state and a second state in response to writing pressure coupled to the switch. An actuator coupled to the carrier is configured to actuate the switch in response to pressure applied to the actuator in response to writing. Various writing inserts such as a multi-mode pen or a mechanical can be coupled to the carrier and operated with the mode switch. For instance, the mode switch can be used to select an automatic feeding mode of a mechanical pencil, a manual feeding mode of a mechanical pencil, or a non-marking stylus mode of a mechanical pencil, or retracted and extended modes of a pen. A tip activates the actuator in response to pressure applied to the tip. In one embodiment the switch is an electrical switch. In one embodiment, the switch is made of a mylar type material. In another embodiment the switch can detect varying levels of pressure.

Another embodiment is in the form of a writing device. A writing insert is configured so that it can be coupled to a carrier. A tip coupled to the writing insert is configured to move a portion of the insert from a first position to a second position for the purpose of actuating a switch within the carrier in response to pressure applied to the tip. In one embodiment the writing device also has a mode selecting assembly configured for selecting modes of the writing insert. In one embodiment the mode selecting assembly can select modes of a pen insert. In another embodiment, the mode selecting assembly can select modes of a mechanical pencil insert, such as automatic feed mode, manual feed mode, or non-marking stylus mode. In one embodiment, the writing insert is keyed to automatically align within the carrier when inserted.

Another embodiment of the present invention is a pressure sensitive writing assembly. The assembly is comprised of a carrier that is configured to receive a writing insert, a writing insert that can be slid into and coupled with the carrier, and a switch coupled to the carrier. An actuator coupled to the carrier is configured to activate the switch in response to pressure applied to the actuator by the writing insert. A tip coupled to the writing insert is configured to slidably move a portion of the writing insert when pressure is applied to the tip. A mode selector is coupled to the carrier and operable to select writing modes of the writing insert without interfering with the operation of the switch. In one embodiment, the carrier defines a channel for receiving the writing insert. In one embodiment, the writing insert has a plurality of ramps that interact with tabs on the carrier to rotatably key the writing insert. In one embodiment the switch is an electrical switch, which may be made of a mylar type material. In one embodiment the switch is a two-position switch. In one embodiment, the switch is a normally open switch. In one embodiment the switch senses varying levels of pressure applied to it. In one embodiment the writing insert is a pen insert and the mode selector can be used to select various writing modes of the pen insert. In another embodiment, the writing insert is a mechanical pencil insert, and the mode selector can be used to select various writing modes of the mechanical pencil.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to various embodiments of the present invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Figure 1:
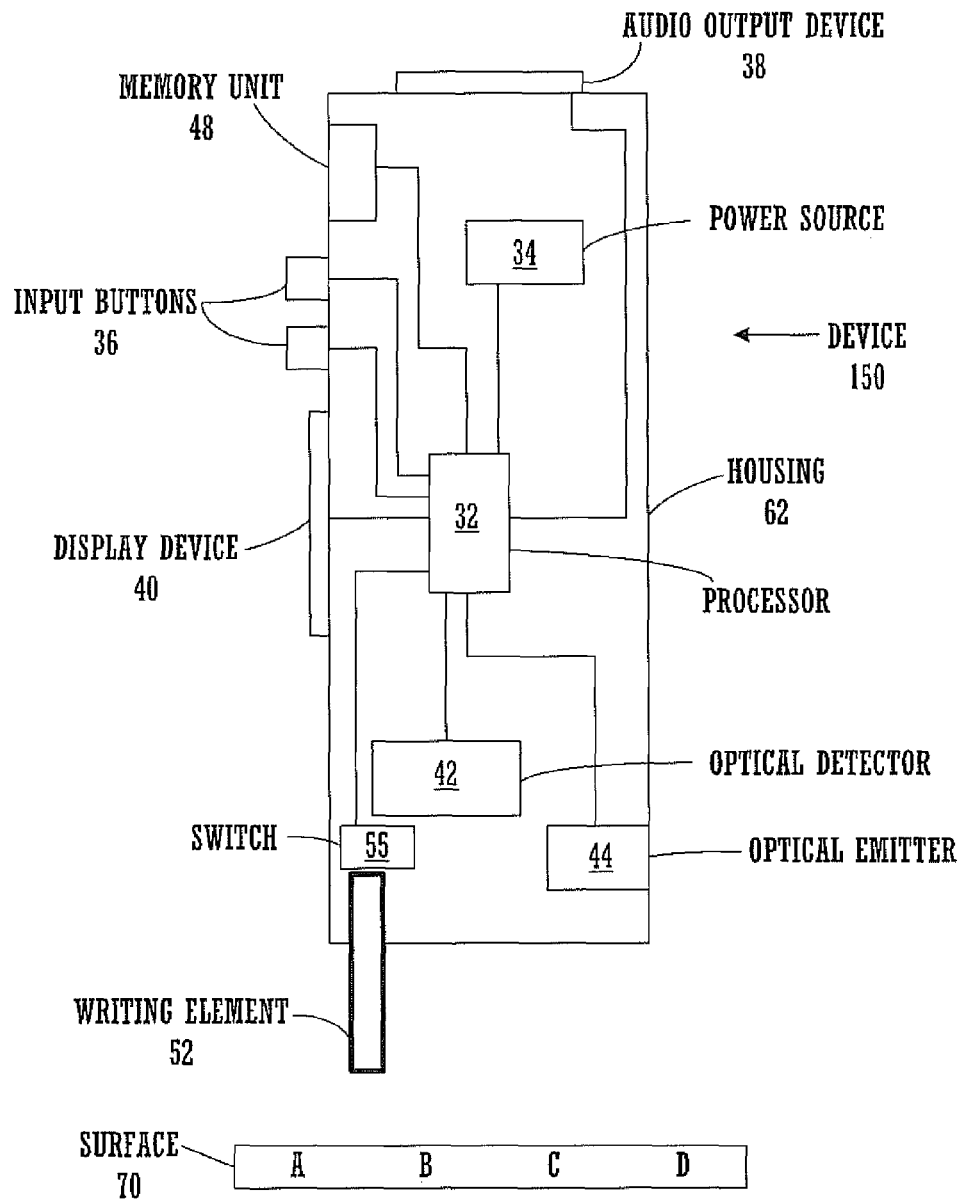
FIG. 1 illustrates an exemplary interactive device according to an embodiment of the present invention.

FIG. 1 is a block diagram of an interactive writing device 150 upon which other embodiments of the present invention can be implemented. In general, interactive writing device 150 may be referred to as an optical device, more specifically as an optical reader, optical pen, digital pen, or digital pencil. The device may contain a computer system and an operating system resident thereon. Application programs may also reside thereon.

In the embodiment of FIG. 1, interactive writing device 150 includes a processor 32 inside a housing 62. In one embodiment, housing 62 has the form of a pen or other writing or marking utensil or instrument. Processor 32 is operable for processing information and instructions used to implement the functions of interactive writing device 150, which are described below.

In the present embodiment, interactive writing device 150 may include an audio output device 38 and an optional display device 40 coupled to the processor 32. In other embodiments, the audio output device and/or the display device are physically separated from interactive writing device 150, but in communication with interactive writing device 150 through either a wired or wireless connection. For wireless communication, interactive writing device 150 can include a transceiver or transmitter (not shown in FIG. 1). The audio output device 36 may include a speaker or an audio jack (e.g., for an earphone or headphone). The display device 40 may be a liquid crystal display (LCD) or some other suitable type of display.

In the embodiment of FIG. 1, interactive writing device 150 may include input buttons 36 coupled to the processor 32 for activating and controlling the interactive writing device 150. For example, the input buttons 36 allow a user to input information and commands to interactive writing device 150 or to turn interactive writing device 150 on or off. Interactive writing device 150 also includes a power source 34 such as a battery.

Interactive writing device 150 also includes a light source or optical emitter 44 and a light sensor or optical detector 42 coupled to the processor 32. The optical emitter 44 may be a light emitting diode (LED), for example, and the optical detector 42 may be a charge coupled device (CCD) or complementary metal-oxide semiconductor (CMOS) imager array, for example. The optical emitter 44 illuminates surface 70 or a portion thereof. Light reflected from the surface 70 is received at and recorded by optical detector 42.

The surface 70 may be a sheet a paper, although the present invention is not so limited. In one embodiment, a pattern of markings is printed on surface 70. The end of interactive writing device 150 that holds optical emitter 44 and optical detector 42 is placed against or near surface 70. As interactive writing device 150 is moved relative to the surface 70, the pattern of markings are read and recorded by optical emitter 44 and optical detector 42. In one embodiment, the markings on surface 70 are used to determine the position of interactive writing device 150 relative to surface. In another embodiment, the markings on surface 70 are used to encode information. The captured images of surface 70 can be analyzed (processed) by interactive writing device 150 to decode the markings and recover the encoded information.

Additional descriptions regarding surface markings for encoding information and the reading/recording of such markings by electronic devices can be found in the following patents and patent applications that are assigned to Anoto and that are all herein incorporated by reference in their entirety: U.S. Pat. No. 6,502,756, U.S. application Ser. No. 10/179, 966, filed on Jun. 26, 2002, WO 01/95559, WO 01/71473, WO 01/75723, WO 01/26032, WO 01/75780, WO 01/01670, WO 01/75773, WO 01/71475, WO 10 00/73983, and WO 01116691.

Interactive writing device 150 of FIG. 1 also includes a memory unit 48 coupled to the processor 32. In one embodiment, memory unit 48 is a removable memory unit embodied as a memory cartridge or a memory card. In another embodiment, memory unit 48 includes random access (volatile) memory (RAM) and read-only (non-volatile) memory (ROM) for storing information and instructions for processor 32.

In the embodiment of FIG. 1, interactive writing device 150 includes a writing element 52 situated at the same end of interactive writing device 150 as the optical detector 42 and the optical emitter 44. Writing element 52 can be, for example, a pen, pencil, marker, stylus, mechanical pencil, multi-mode writing device, or the like, and may or may not be retractable. Writing element 52 may also be comprised of many parts such as a carrier (not shown) a removable writing insert (not shown). Writing element 52 may also comprise a switch 55 to detect writing pressure. In certain applications, writing element 52 is not needed. In other applications, a user can use writing element 52 to make marks (e.g., graphical elements or user-written selectable items) on surface 70, including characters such as letters, words, numbers, mathematical symbols and the like. These marks can be scanned (imaged) and interpreted by interactive writing device 150 according to their position on the surface 70. The position of the user-produced marks can be determined using a pattern of marks that are printed on surface 70. In one embodiment, the user-produced markings can be interpreted by interactive writing device 150 using optical character recognition (OCR) techniques that recognize handwritten characters.

Figure 2:
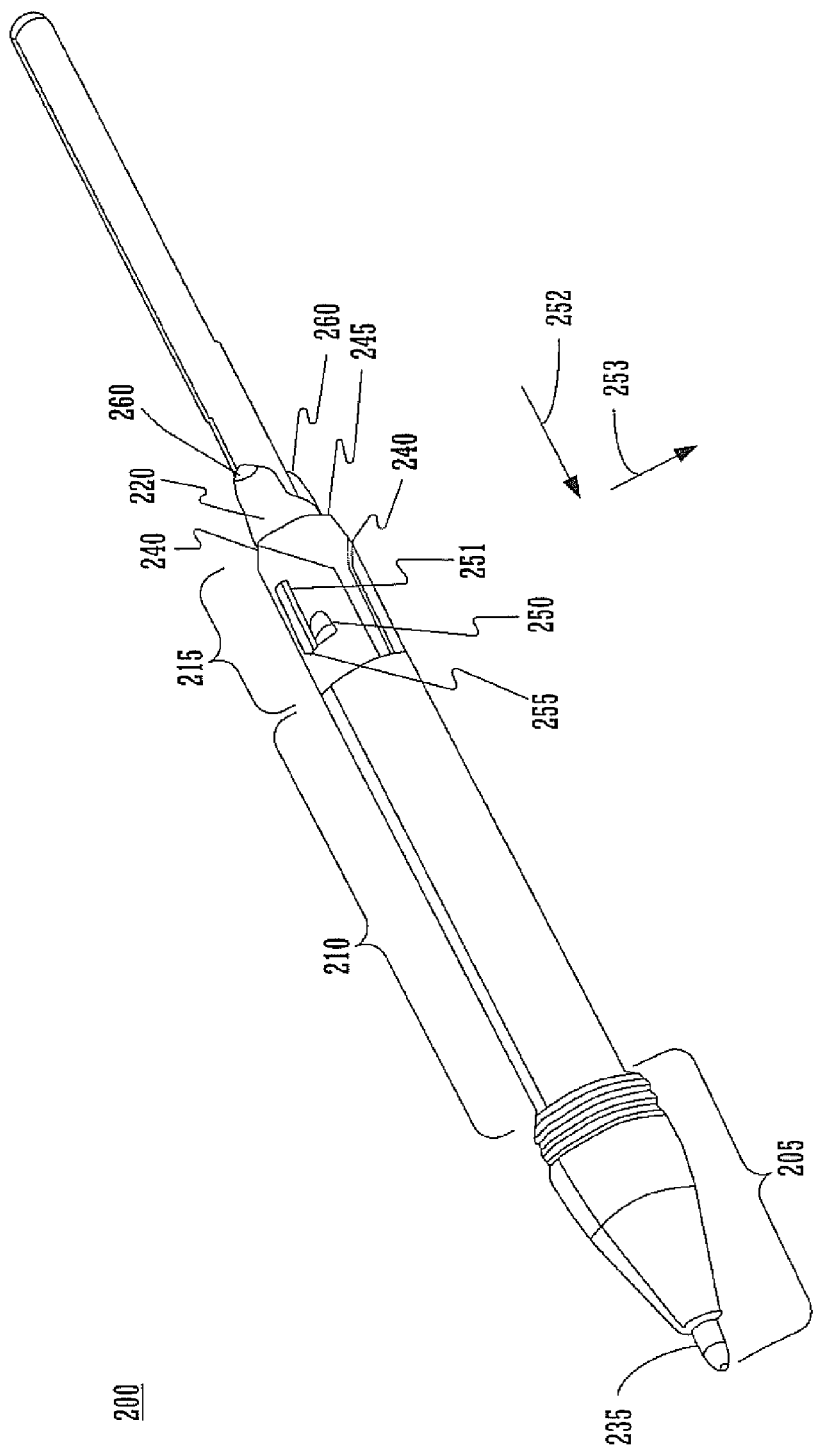
FIG. 2 shows an exemplary writing insert that can be utilized with embodiments of the present invention.

FIG. 2 shows an exemplary writing insert 200 that can be utilized with embodiments of the present invention. Writing insert 200 is comprised of a tip assembly 205 which is coupled to a barrel enclosure assembly 210, a guide 215 which is rotatably coupled to barrel enclosure assembly 210, a slide which is slidably and rotatably coupled within guide 215, and a reservoir 230 which is slidably and rotatably coupled within slide 220, guide 215 and barrel enclosure 210. Writing insert 200 can be configured for use with interactive writing device 150.

In one embodiment tip assembly 205 is threaded on one end and has a slidably coupled spring loaded tip 235 on the other end. Tip 235 can be solid or hollow. Tip 235 can comprise various forms such as an ink pen tip, a mechanical pencil tip, a stylus tip, or a combination tip such as a mechanical pencil tip that can also be used as a non-marking stylus. In the embodiment shown in FIG. 2, tip 235 is a mechanical pencil tip that serves a dual role as a stylus when lead is retracted. In one embodiment, tip assembly 205 may be detachable from the remainder of writing insert 200. In one embodiment, tip assembly 205 contains inner workings for a mechanical pencil, while in another embodiment, tip assembly 205 serves as a guide for a stylus or tip of an ink pen.

In one embodiment barrel enclosure assembly 210 contains portions of a mechanical pencil. In another embodiment, barrel enclosure assembly 210 contains portions of a pen (such as a retractable and extendable ink pen) or some other writing device such as a stylus or highlighter. Barrel enclosure assembly 210 is configured to move slidably in response to pressure applied to tip 235.

Figure 3:
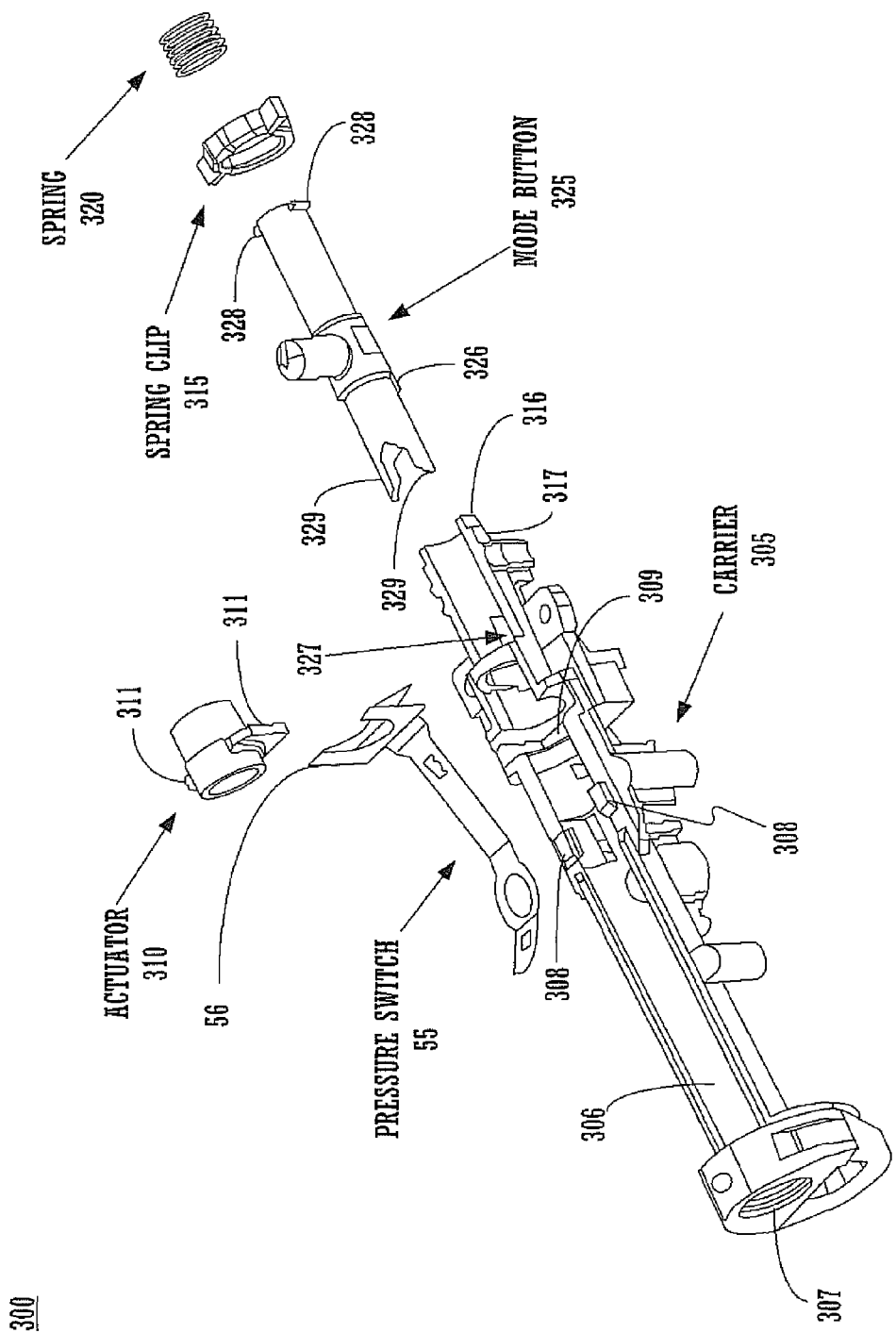
FIG. 3 is an exploded view of an exemplary writing insert holder according to an embodiment of the present invention.

Guide 215 is rotatably coupled to barrel enclosure assembly 210 in one embodiment of the present invention, and is configured to move slidably in response to pressure applied to one side from tip 235. In one embodiment, guide 215 has four ramps 240 (two shown) for keying guide 215 with a carrier 305 (FIG. 3). Guide 215 also has a rim 245 for interfacing with an actuator 310 (FIG. 3) to transfer pressure to actuator 310 from tip 235. In one embodiment, guide 215 also comprises an L-shaped channel 255 in which a snap 250 of slide 220 traverses to select writing modes of writing insert 200. The L-Shaped channel 255 configuration of guide 215 has two stop points, or detent positions, the first position is pointed to by arrow 251, while snap 250 is shown locked into the second position. It should be appreciated that more selectable configurations and stop points are possible in other embodiments simply by changing the shape of the channel in guide 215. Guide 215 shown in FIG. 2 is exemplary, and it should be noted that in other embodiments of the present invention, guide 215 can be longer or shorter than shown.

Slide 220 is slidably and rotatably coupled within guide 215 and is configured to move in response to force applied to tip 235. Snap 250 of slide 220 traverses within a channel 255 of guide 215, which defines and limits the sliding and rotation of slide 220. One end of slide 220 has teeth 260 (two shown, but more are possible) which can be acted on by a mode selector such as mode selector 325 (FIG. 3) to slide and rotate slide 220 for the purpose of interacting with spring loaded internal workings (not shown) located inside barrel enclosure assembly 210. By moving these internal workings to different positions, and then holding or releasing the position, such as by the use of a stop point in channel 255, slide 220 can manipulate the internal workings for selecting and engaging various possible writing modes of writing insert 200. Spring force coupled through the internal workings (not shown in FIG. 2) pushes slide 220 outward until it is either stopped by snap 250 at the top of channel 255, shown by arrow 251, or locked via spring force against a lower edge of channel 255, as shown by the position of snap 250 in FIG. 3. The combination of slide 220, guide 215, and the internal spring force of writing insert 200 comprises a mode selecting assembly within writing insert 200 that works in conjunction with mode selector assembly 400 (FIG. 4) to select operating modes of writing device 200.

Reservoir 230 is for containing writing materiel such as a supply of leads, ink, or highlighter fluid. Reservoir 230 is slidably and rotatably coupled within slide 220 and is configured to move in response to force applied to tip 235 and also in response to pressure applied to slide 220 by mode button 325 (FIG. 3). Reservoir 230 can be of various lengths in other embodiments, and is optional in embodiments where it not needed (such as for a stylus only writing insert) or where its functions are performed by a reservoir that fits internally within barrel enclosure assembly 210.

In the embodiment shown in FIG. 2, exemplary writing insert 200 is shown as an automatically feeding mechanical pencil, with a selectable non-marking stylus writing mode. These two modes of operation, automatic pencil and non-marking stylus, are selected based on the stop position that snap 250 is placed in. In the present embodiment, the automatic feed pencil mode is selected by placing snap 250 into position 251 in L-shaped channel 255. By repeatedly sliding snap 250 in direction 252, the mechanical pencil can be caused to manually feed lead, which can be considered a temporarily selectable third mode. By sliding snap 250 in direction 252 and then rotating snap 250 in direction 253, snap 250 can be placed in the second stop position (this is the location of snap 250 as shown in FIG. 2), and a non-marking stylus mode can be selected. In other embodiments of the present invention, other types of writing inserts such as ink pens can be used. Similar guide and snap arrangements also allow various modes of operation of an ink pen, for example, to be selected. For instance, with an ink pen writing insert, a first position of a snap can retract a pen tip for storage, thus allowing the writing insert to be used as a non-marking stylus, while a second position of a snap can extend a pen tip for writing.

Figure 5:
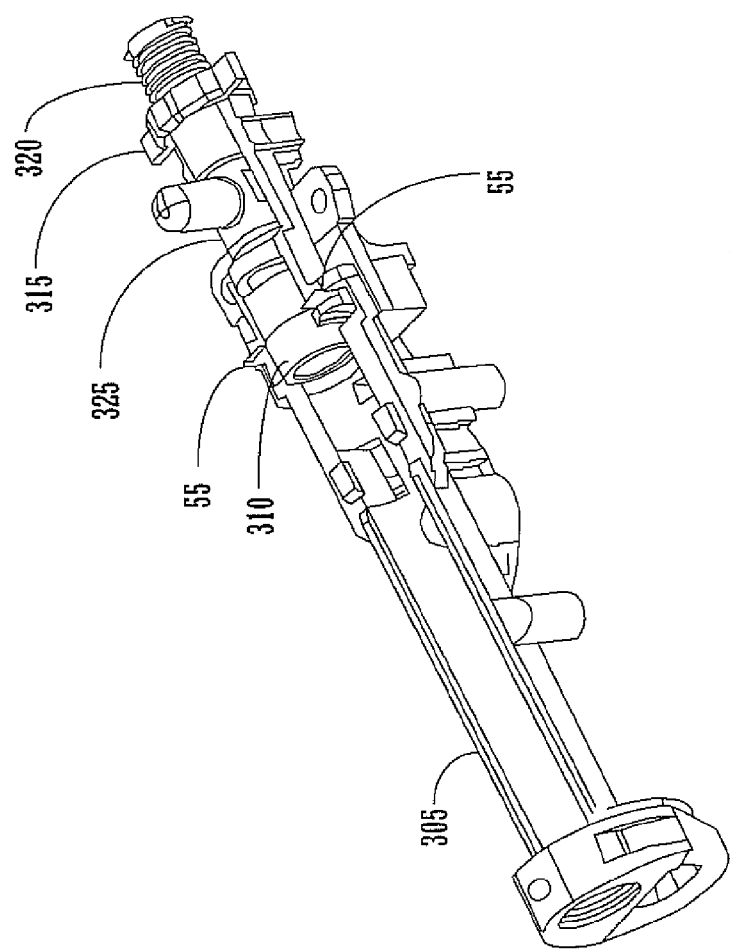
FIG. 5 shows an exemplary assembled writing insert holder in accordance with an embodiment of the present invention.

FIG. 3 is an exploded view of an exemplary writing insert holder 300 according to an embodiment of the present invention. FIG. 3 is utilized to show and describe the separate parts and features of writing insert holder 300. An assembled version of writing insert 300 is shown in FIG. 5 and is useful for understanding some of the interactions of the parts described in conjunction with FIG. 3. Writing insert holder 300 is comprised of a carrier 305, actuator, 310, spring clip 315, spring 320, mode button 325, and switch 55.

Carrier 305 may be constructed from an injection molded plastic material but can be comprised of other suitable materials and manufacturing processes. Carrier 305 defines a channel 306 for receiving a writing insert (not shown) on one end and mode button 325 on the other end. One end of carrier 305 may contain treads such as threads 307 for securing a tip assembly (not shown) or for securing a writing insert such as a pen, stylus, mechanical pencil, or other writing instrument. Carrier 305 comprises tabs 308 for interacting with a portion of a writing insert (not shown) to rotatably orient a writing insert as it is slidably inserted into carrier 305. Carrier 305 defines a recess 309 for housing an actuator and a switch such as actuator 310 and switch 55. Carrier 305 also has a slot (not shown) for allowing pass through of a portion of switch 55. Carrier 305 comprises a lip 316 and protrusion 317 for orienting and securing spring clip 315. Carrier 305 also defines a guide 327 that interacts with a snap 326 on mode button 325 to slidably orient mode button 325 within channel 306 and to secure mode button 325 into a rotatably selectable position or positions within channel 306.

Switch 55 is constructed of a flexible plastic type material such as mylar, with a printed conductive pattern. One end 56 of switch 55 defines an oval shaped hole that takes the shape of a semicircular cutout when folded for insertion into recess 309. The normal position (as shown) for switch 55 is open, or non conductive, however other embodiments can use a normally closed switch. One advantage a normally open switch is power savings, because electricity is only conducted when the switch is closed due to writing pressure. When the folded end 56 of switch 55 is fully compressed, the conductive pattern is shorted out, and switch 55 becomes a closed circuit. The folded portion 56 of switch 55 creates a spring force that causes switch 55 to spring back to the open position (shown) when no (or low) external forces are acting to keep switch 55 forcibly closed. The non-folded end of switch 55 slips through a slot (not shown) in the bottom of recess 309 and can be attached to circuitry of interactive writing device 150, such as processor 32. Switch 55 as show is a two-position switch, but other embodiments can utilize a switch that has more positions, or a switch that senses varying levels of pressure. An advantage to using a switch that detects varying levels of pressure is the ability to measure how much force a user applies when writing. This can be used to provide emphasis to a computer-generated version of user written items recorded by an interactive writing device.

Actuator 310 has tabs 311 for aligning within recess 309. Tabs 311 are slidably coupled to recess 309, while the cylindrical body of actuator 310 is slidably disposed within channel 306. The cylindrical body of actuator 310 fits over the folded end 56 of switch 55 and retains the folded portion 56 in recess 306. The toothed end of mode button 325 is inserted into one end of actuator 310, while a toothed portion 260 (FIG. 2) of a writing insert 200 (FIG. 2) can be partially inserted the other end of actuator 310. An inkwell or lead storage reservoir 230 (FIG. 2) of the writing insert 200 (FIG. 2) can protrude partially or completely through the center of actuator 310 and onward into or through the hollow cylindrical center of mode button 325.

Mode button 325 is slidably and rotatably coupled within channel 306 with the toothed end protruding slightly into actuator 310. Snap 326, which protrudes from mode button 325, interfaces with guide 327 to slidably orient mode button 325 and to secure mode button 325 in a rotatably selectable position. Spring clip 315 slides onto mode button 325 as does spring 320. Spring 320 is then compressed between spring clip 315 and tabs 328 (two shown, but more or less are possible) at the end of mode button 325. Force from spring 320 acts on tabs 328 to pull mode button 325 in a direction away from actuator 310, and cause snap 326 to lock into stops (not shown) in guide 327. The same spring force also pulls teeth 329 of mode button 325 away from teeth 260 (FIG. 2) of slide 220 (FIG. 2) except when mode button 325 and slide 220 (FIG. 2) are manually coupled with one another by a user for the purpose of selecting or engaging a mode of operation in writing insert 200. After a user releases mode button 325, spring force from spring 320 automatically disengages mode button 325 from slide 220 (FIG. 2) and locks clutch 326 against a selected stop (not shown) in guide 327.

Figure 4:
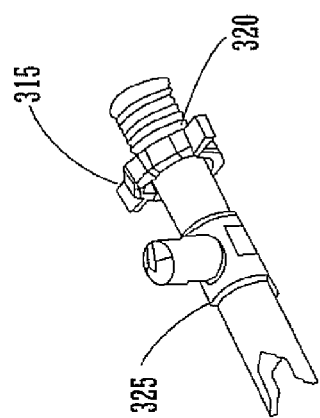
FIG. 4 shows an exemplary mode selecting assembly according to an embodiment of the present invention.

FIG. 4 shows an assembled exemplary mode selector assembly 400 in accordance with an embodiment of the present invention. Mode selector assembly 400 is comprised of mode button 325, spring clip 315 and spring 320. The functionality of mode selector assembly 400 is as described in conjunction with the individual parts of mode selector assembly 400, which were shown and described in FIG. 3.

FIG. 5 shows an exemplary assembled writing insert holder 300 in accordance with an embodiment of the present invention. FIG. 5 illustrates how the parts of FIG. 3 are assembled in to a holder 300 which can be coupled to an interactive writing device such as interactive writing device 150. Writing instrument holder 300 is comprised of a carrier 305, actuator 310, spring clip 315, spring 320, mode selector button 325, and switch 55. In the embodiment shown in FIG. 5, various mounting posts and holes are also visible (not labeled) and can be utilized to couple writing insert holder with interactive writing device 150 and other devices and assemblies. The embodiment shown is exemplary, and other suitable means may be used to couple writing insert holder 300 to other devices and assemblies. FIG. 5 also shows mode selector assembly 400 installed and oriented in carrier 305. Note that teeth 329 (FIG. 3) of mode selector button 325 are disposed within actuator 310, and that mode selector button can freely slide and rotate within actuator 310.

Figure 6:
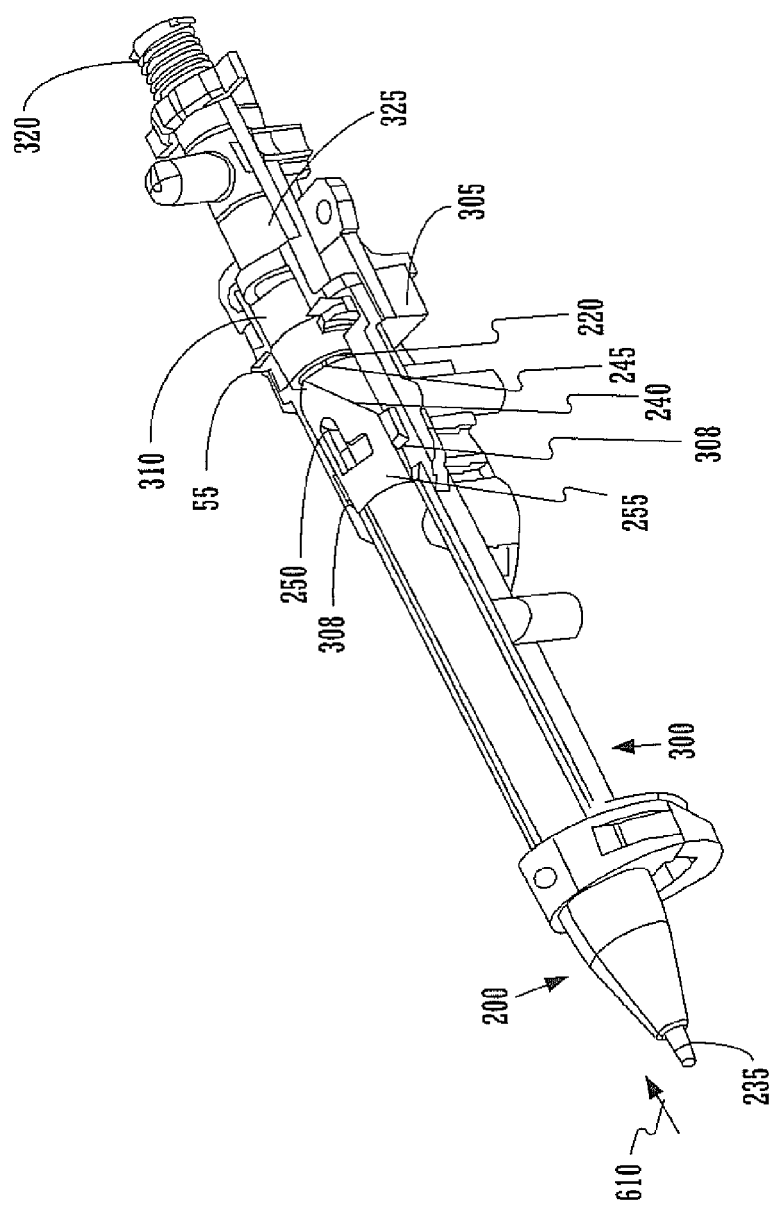
FIG. 6 shows an exemplary assembled writing insert holder coupled with an exemplary writing insert in accordance with an embodiment of the present invention.

FIG. 6 shows an exemplary assembled writing insert holder 300 coupled with an exemplary writing insert 200 in accordance with an embodiment of the present invention. Note again that the teeth 329 (FIG. 3) of selector button 325 are disposed within actuator 310. Note also that the teeth 260 (FIG. 2) of slide 220 are also disposed within actuator 310. This arrangement allows force to be manually applied with mode selector button 325 through the hollow center of pass through actuator 310. The force can be applied to a portion of a writing insert, such as the teeth 260 of slide 220 or teeth 1060 of slide 1020 (FIG. 10), that is slidably disposed partially within the hollow center of pass through actuator 310, without transferring any force to actuator 310 or switch 55. Mode selection button 325 can slide and rotate slide 220 into various positions that will then be locked-in by internal spring force from writing insert 200 acting to wedge snap 250 into guide 255, when pressure from mode selection button 325 is removed.

This arrangement advantageously allows various modes of a writing insert to be selected without interrupting or interfering with the functionality of switch 55, which is used to detect writing pressure. Additionally, after manual force on mode selection button 325 is released, spring 320 pulls mode selection button 325 slightly away from slide 220, and into a selected stop point that snap 326 (FIG. 3) is aligned with in channel 327 (FIG. 3). By pulling mode selection button away from slide 220, mode selection button 325 is prevented from interfering with any sliding motion imparted to any portion of writing insert 200 by tip 235.

FIG. 6 also illustrates the interaction of ramps 240 (one visible) with tabs 308, to cause writing insert to self-align when inserted in carrier 305. In the embodiment shown, only two alignments are possible, 180 degrees apart from one another. Also, in the embodiment shown, the interaction between rim 245 of guide 215 and actuator 310 are appreciable. For example, as pressure applied in direction 610 to moveable tip 235 (for instance by writing), transferred force causes guide 215 to slidably move in direction 610 and interface with actuator 310 to close switch 55. When pressure from tip 235 is released, spring force from folded switch 55 forces switch 55 to an open position and pushes actuator 310 and guide 255 back toward tip 235. No part of the interaction between tip 235, actuator 310, and switch 55 is interfered with by the selection of writing modes via mode button 325. Switch 55 is operable to detect writing pressure when mode button 325 and snap 250, of slide 220, are locked in a first position, such as an automatic feed mode of a mechanical pencil.

In an alternative single mode embodiment (not shown) a stylus insert or a writing insert such as a pen, pencil, marker, chalk or crayon is utilized in a manner that interfaces only with actuator 310, but not with mode selector assembly 400 in any manner for the purpose of changing operating modes. In this single mode embodiment, a stylus insert or writing insert has a surface that interfaces with actuator 310 to pass writing force applied to the writing instrument into actuator 310 to close switch 55 in response to writing. Movements of mode button 325 have no mode altering effect on the writing insert in this embodiment of the invention. A single mode embodiment, such as this, is useful for instance with large writing instruments such as crayons, markers, or chalks, but can also be utilized with a stylus or other writing instruments.

Figure 7:
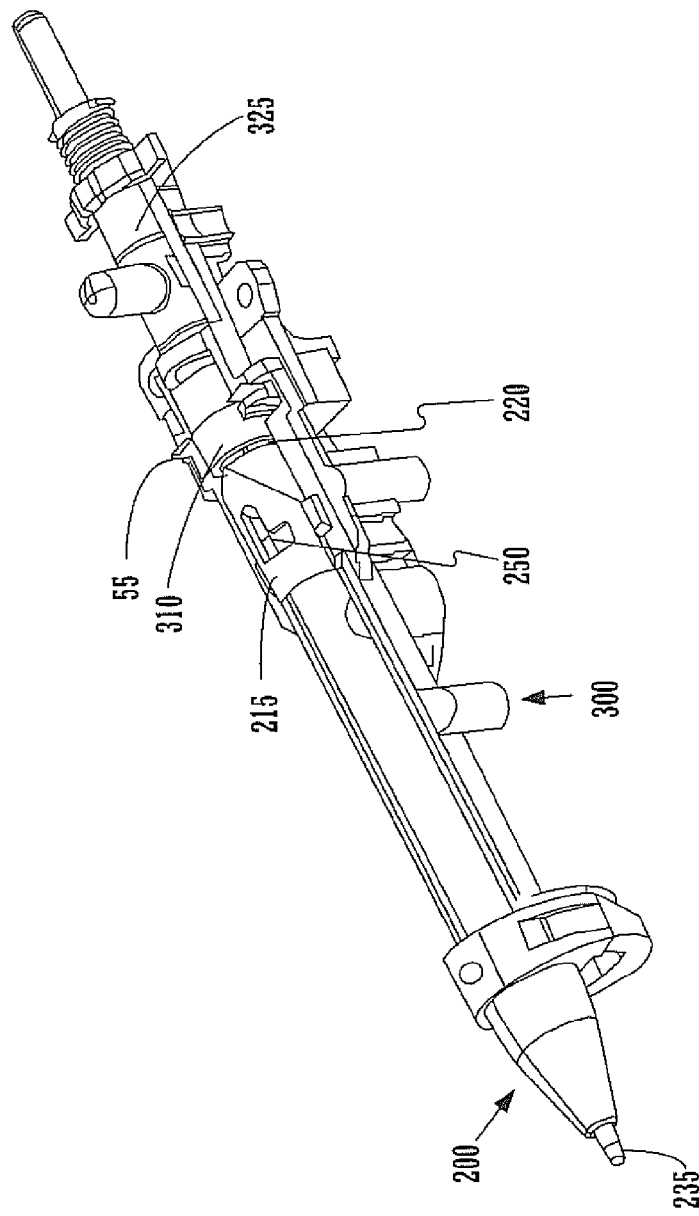
FIG. 7 shows an exemplary assembled writing insert holder coupled with an exemplary writing insert in accordance with an embodiment of the present invention.

FIG. 7 shows an exemplary assembled writing insert holder 300 coupled with an exemplary writing insert 200 in accordance with an embodiment of the present invention. The difference between FIG. 6 and FIG. 7 is that mode button 325 and snap 250 of slide 220 are locked in a second position. In the illustrated embodiment, this second position is a non-marking stylus mode of the mechanical pencil insert 200 that is shown. In the non-marking stylus mode, writing pressure is applied directly to tip 235, whereas in a lead feeding mode, writing pressure is applied tip 235 through writing with a lead that extends from tip 235. As explained, changing modes of operation imparts no force or movement to switch 55 or actuator 310. This is because force from spring 320 and mode button 325 are isolated from actuator 310, and in addition, internal spring forces from writing insert 200 are isolated from actuator 310 by snap 250 which limits sliding motion of the internal components of writing insert 200.

As can be seen, even though slide 220 and snap 250 have changed positions inside guide 215 (compared to FIG. 6), guide 215 is still located in the same position relative to actuator 310 as it was in FIG. 6. This shows that the interaction between moveable tip 235, guide 215, actuator 310 and switch 55 is unchanged from the interaction previously described in conjunction with FIG. 6. This also shows how switch 55 is still operable to detect writing pressure applied to tip 235, even though writing insert 200 is in a different writing mode (non-marking stylus mode). In other embodiments, this same arrangement is employable to isolate mode selecting force from a pressure sensing switch in other writing inserts, such as pen insert that can change from a retracted to an extended mode of operation. By decoupling mode selection forces and a writing insert's internal spring forces from switch 255 and actuator 310, as described, more functionality such as a plurality of operational modes can be added to a writing insert and selected for operation, without interfering with a writing pressure sensing switch, such as switch 55, due to spring forces in the insert or forces exerted by the mode selector. Further, a switch such as switch 55 continues to operate unimpeded, throughout the plurality of selectable modes of a writing device or writing insert.

Figure 8:
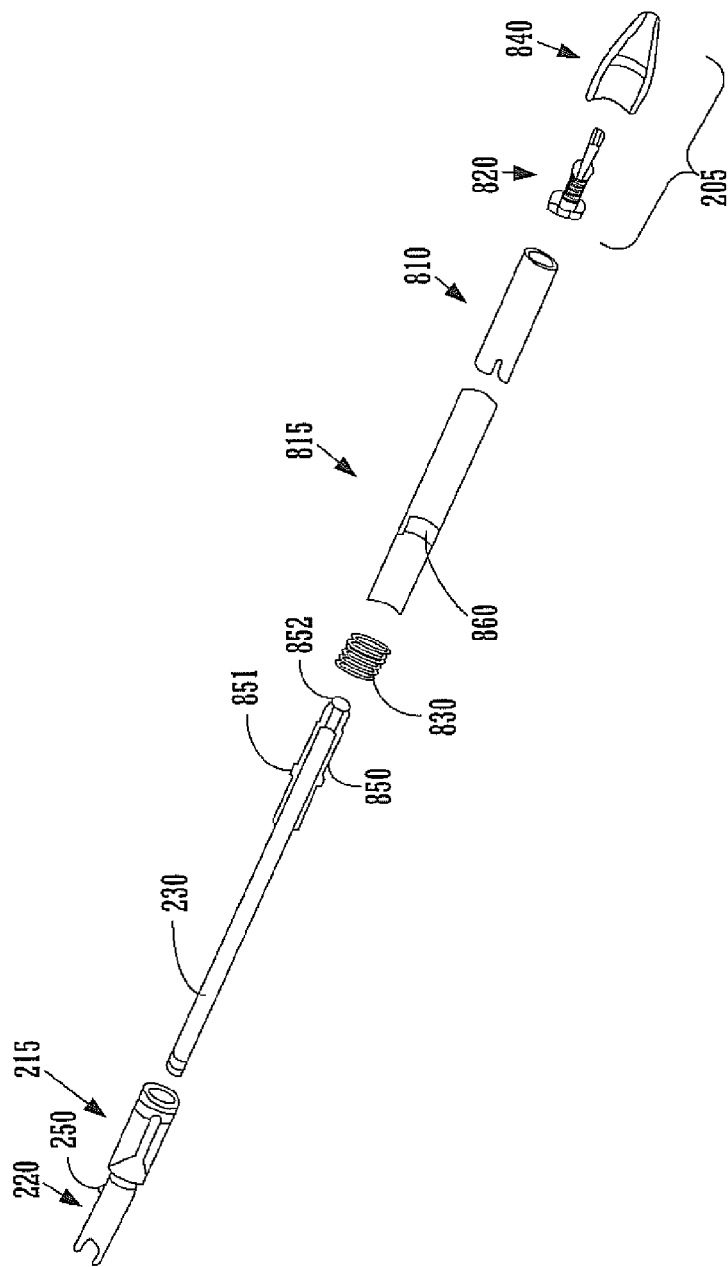
FIG. 8 shows a partial-sectional view displaying the inner workings of an exemplary writing insert in accordance with an embodiment of the present invention.

FIG. 8 shows a partial-sectional view displaying the inner workings of an exemplary writing insert 200 in accordance with an embodiment of the present invention. In the displayed embodiment, writing insert 200 is configured as an automatically feeding mechanical pencil with a manual feed capability and a selectable non-marking stylus mode of operation. Writing insert 200 is configured to insert into a carrier and operate with a pressure sensing switch assembly for use with an interactive writing device. However, in other configurations, writing insert 200 can be configured as a stand alone multi-mode writing device, or as a multimode stylus for use with a computer or personal digital assistant (PDA).

Writing inert 200 is comprised of a slide 220 that is rotatably and slidably coupled to a guide 215 (both previously described), a lead tube/reservoir 230, a tube 850, a main spring 830, a barrel enclosure 815, a clutch assembly 810, and a tip assembly 205. Tip assembly 205 is comprised of a tip housing 840 and an inner tip assembly 820. Reference to FIG. 2 and previously described elements will be made in the description of writing insert 200 shown in FIG. 8.

Slide 220 is slidably and rotatably coupled with guide 230 and contains a snap 250 for securing slide 220 into selectable positions corresponding to writing modes of writing insert 200. Slide 220 is also slidably and rotatably coupled to reservoir 230 and tube 850. Snap 250 moves slidably and rotatably within a channel 255 (FIG. 2) defined in guide 215. Snap 250 can secure slide 220 into position 251 (FIG. 2), which corresponds to a mechanical pencil automatic feeding mode, or into a second position corresponding to a mechanical pencil non-marking stylus mode (shown by the position of snap 250 in FIG. 2). An edge of slide 220 interfaces with collar 851, which supplies spring force from main spring 830 to secure slide 220 into selectable positions.

Guide 215 is rotatably coupled to barrel enclosure 815, either by threads or a press fit or some other suitable secure manner. This secure coupling contains the spring force from main spring 830, which is supplied to slide 220 and locks snap 250 into selectable positions within channel 255 (FIG. 2) of guide 215.

Reservoir 230 is for storing a supply of leads for writing and for supplying one lead at a time to clutch assembly 810. Reservoir 230 is securely coupled within tube 850, either by a press fit or some other removable or permanent means.

Tube 850 is for securing reservoir 230. Tube 850 also comprises collar 851, which is for retaining one end of main spring 830 and transferring force from main spring 830 to slide 220. Tube 850 also defines an opening 852 for securing a portion of clutch halves 917 and 918 (described in FIG. 9), and for allowing the passage of leads from reservoir 230 toward clutch assembly 810. Tube 850 is partially disposed within barrel enclosure 815, and one end is also partially disposed within clutch assembly 810.

Main spring 830 is compressed between collar 851 and stop 860, and supplies force to slide 220, which is utilized to cause slide 220 to rebound from manual compression by a user (for example, with mode button 325 of FIG. 3) and also to secure slide 220 into selectable positions in guide 215, as previously described.

Barrel enclosure 815 is made of metal, but can also be made of other suitable materials. Barrel enclosure 815 also comprises stop 860. In one embodiment barrel enclosure 815 has a threaded end for coupling to guide 215. In one embodiment, guide 215 is rotatably coupled to barrel enclosure 815. Barrel enclosure 815 provides an outer housing for a portion of tube 850 and for clutch assembly 810.

Clutch assembly 810 is disposed within barrel enclosure 815 and is used for securing a lead, which is used for writing. Clutch assembly 810 may also interchangeably be referred to as a brake assembly. One end of clutch assembly 810 is coupled to tube 850, while the other end is coupled to tip assembly 205. Functionality of clutch assembly 810 is more completely described in conjunction with FIG. 9.

Tip assembly 205 is comprised of a tip housing 840 that has threads or other securing means for coupling to a housing or a carrier such as carrier 305 (FIG. 3). Tip assembly 205 is also comprised of inner tip assembly 820 that is used for guiding, securing, and automatically feeding a lead. Inner tip assembly 820 is described more completely in conjunction with FIG. 9.

Figure 9:
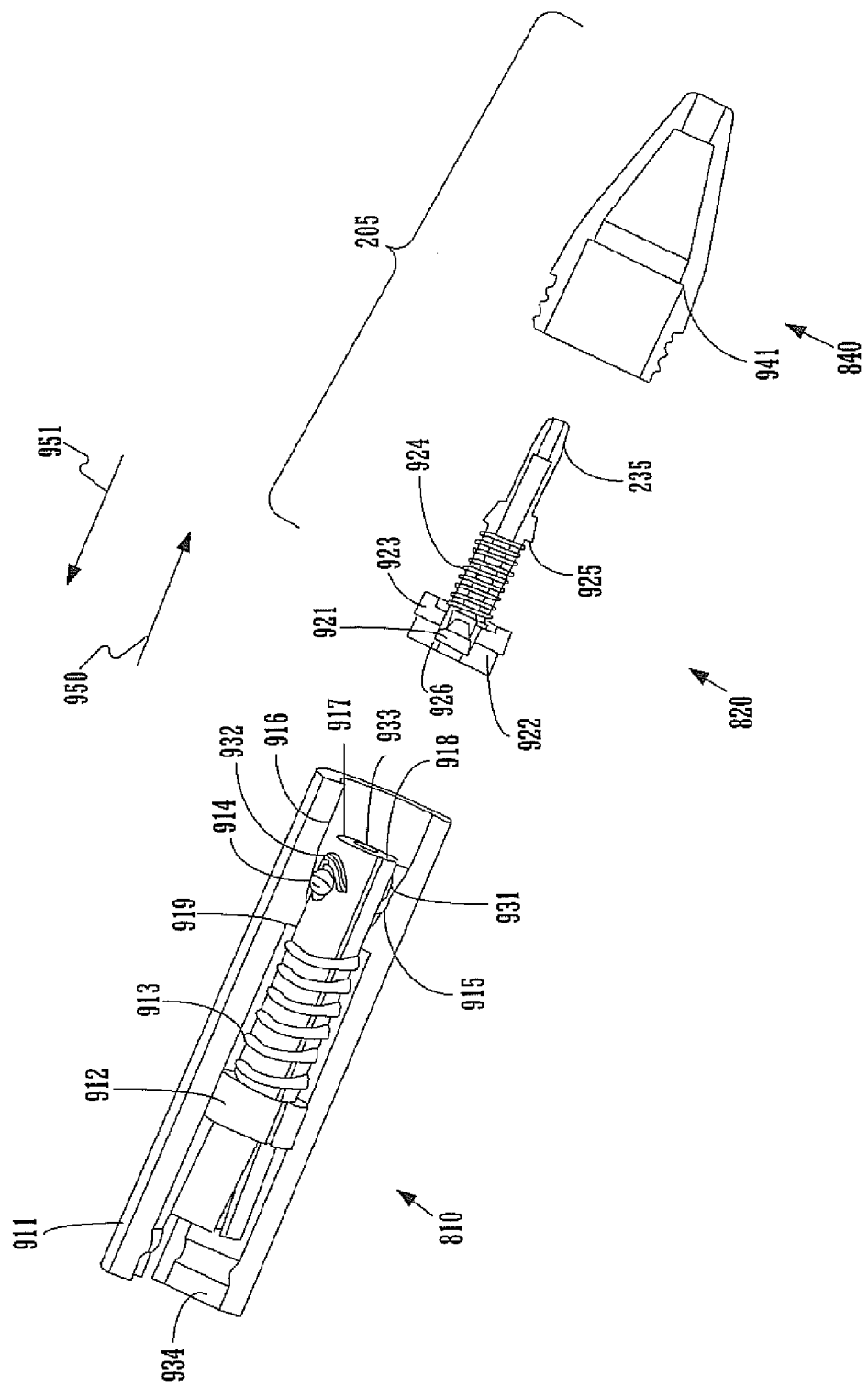
FIG. 9 shows an enlarged view of a clutch assembly and a tip assembly for an exemplary mechanical pencil in accordance with an embodiment of the present invention.

FIG. 9 shows an enlarged view of a clutch assembly 810 and a tip assembly 205 for an exemplary mechanical pencil in accordance with an embodiment of the present invention.

Clutch assembly 810 is comprised of a housing 911, two clutch halves 917 and 918, a spring 913, two bearings 914 and 915, and two ribs 931 and 932. Clutch assembly 810 is for securing and releasing a lead, and is particularly configured to securely grip and engage colored leads, such as blue leads, which are softer and more slippery than commonly used graphite type leads. Other embodiments utilize a clutch assembly with features configured for gripping normal graphite leads. Clutch assembly 810 is engaged and disengaged by pressure provided via a coupling to tube 850 (FIG. 8). In one embodiment of the present invention, tube 850 transmits force from mode button 325 (FIG. 3) to clutch assembly 810.

Housing 911 is a tube used for housing clutch halves 917 and 918, main spring 913, bearings 914 and 915, and ribs 931 and 932. Housing 911 defines a stop 919, which stops one end of spring 913, and a conical ramp 916 that serves as a guide for bearings 914 and 915. Housing 911 is slidably disposed within barrel enclosure 815 (FIG. 8), and couples with stop 860 (FIG. 8) to transmit writing pressure from tip assembly 205 into barrel enclosure 815 and upward to guide 215 (FIG. 8).

Clutch halves 917 and 918 are slidably coupled within housing 911 and mate together to define a somewhat cylindrical opening 933 for a lead to pass through, and to grip a lead with. Clutch halves 917 and 918 each have a recess for receiving a bearing such as bearings 914 and 915. In one embodiment, bearings 914 and 914 are spherically shaped metal balls. When mated, clutch halves 917 and 918 each define a semi-circular half of stop 912, which is used to provide a stop for an end of spring 913.

When clutch halves 917 and 918 are closed together and engaged (as shown) in a first position, a lead can be secured between the two halves by contact points within the defined somewhat cylindrical opening, and thus prevented from moving in direction 951 when writing pressure is applied to a lead. Force can be applied to clutch halves 917 and 918 via tube 850 (FIG. 8), which slidably couples into opening 934. Opening 852 in tube 850 couples with clutch halves 917 and 918. By moving clutch halves 917 and 918 slidably within housing 911 in direction 950, towards a second position, the ends of the clutch halves that are disposed within conical opening 916 will be allowed to spread apart from one another. This spreading is controlled by the interaction between bearings 914 and 915, conical opening 916, and the halves of clutch 917 and 918. The spreading of the clutch halves allows the lead, previously gripped by clutch halves 917 and 918 to be released or disengaged. Ribs 931 and 932 act to prevent bearings 914 and 915 from dislodging as they slidably interface with the wall of conical opening 916.

In one embodiment of clutch assembly 810, the surfaces of the clutch halves 917 and 918, which define opening 933, are configured to grip colored lead (such as blue lead), which is more slippery than ordinary graphite lead. This can be done by adding grooves to the surfaces used for gripping the lead, by other means such as using a material that does not slide when gripping a colored lead, or by manufacturing the halves 917 and 918 so that opening 933 is slightly smaller or tapered at one end. Other embodiments of the present invention utilize clutch halves 917 and 918 that are configured for gripping graphite type leads.

Referring to FIG. 2, slide 220 is shown secured into a non-marking stylus position, which compresses spring 913, slides clutch halves 917 and 918 in direction 950, and allows a lead to freely slide between the disengaged clutch halves 917 and 918 within clutch assembly 810. When slide 220 is placed into position 251, clutch halves 917 and 918 are moved in direction 951 by spring force from spring 913 acting on collar 912 and assume a position as shown in FIG. 9, where a lead is securely engaged and gripped for automatic feeding in conjunction with tip assembly 205.

FIG. 9 also shows a tip assembly 205, that is comprised of a tip housing 840 and an inner tip assembly 820. Inner tip assembly 820 is used to guide and automatically feed a lead, in a manner conventionally known in the art. Inner tip assembly 820 is comprised of a bushing 921, a plunger 922, a retaining ring 923, a spring 924, and hollow tip 235.

Retaining ring 923 is slidably coupled to tip 235 and secures inner tip assembly 820 inside tip housing 840 through a means such as a press fit against the inner wall 941 of tip housing 840. Retaining ring 923 also serves as a stop for one end of spring 924.

Tip 235 is hollow, has a cylindrical opening for lead to pass through, and can be constructed of metal, plastic, or other suitable materials. Tip 235 is slidably movable relative to tip housing 840 in response to writing pressure applied to a lead extending from tip 235 or in response to writing pressure applied directly to tip 235. Tip 235 also comprises a circular stop 925, which provides a stop for one end of spring 924. Plunger 922 and bushing 921 are fixedly coupled to tip 235. Plunger 922 has a lip 926 that slightly overlaps bushing 921, to trap bushing 921 between plunger 922 and tip 235. Plunger 922 interfaces with housing 911, in response to writing pressure, to transfer motion from tip 235 to housing 911. In one embodiment of the present invention, bushing 921 is made of a resilient material such as a silicon, plastic, or rubber material.

Tip 235 slidably moves in direction 951, in response to writing pressure, thus compressing spring 924 between retaining ring 923 and circular stop 925. If clutch assembly 810 is engaged, and thus gripping a lead, bushing 921 will slide in direction 951 along the lead in response to writing pressure. However if clutch assembly 810 is disengaged, writing pressure will cause the lead to slide in direction 951 within bushing 921, until no lead extends from tip 235. When writing pressure is released, spring 924 moves tip 235 back in direction 950, and bushing 921 grips a lead (not shown) and moves in direction 950. When clutch assembly 810 is engaged, the sliding and gripping of bushing 921 works in conjunction with clutch assembly 810 to automatically advance lead in response to writing pressure. In this automatic feed mode, a lead continually slightly feeds out tip 235 to replenish lead used up by writing.

When clutch assembly 810 is disengaged, a lead (not shown) which previously extended from tip 235 is pushed in direction 951 in response to writing pressure, causing bushing 921 to slip along the lead in direction 950, until the lead no longer extends from tip 235. Bushing 921 then grips the lead, but cannot slide in direction 951 relative to the lead because clutch assembly 810 is no longer engaged to hold the lead in place. Thus with clutch 810 disengaged, lead feeding no longer takes place. This allows allows tip 235 to be used as a non-marking stylus until clutch assembly 810 is re-engaged.

Tip assembly 205 transmits writing force pressure from tip 235 in direction 951. In non-writing (stylus) mode, writing pressure is transmitted from plunger 922 to a first end of clutch housing 911. In writing mode, writing pressure is transmitted from the lead directly into clutch 810, which is gripping the lead. A second end of the clutch housing 911 interfaces with stop 860 and transfers writing force pressure into barrel enclosure 815. Barrel enclosure 815 transfers the writing force pressure to guide 215. Guide 215 then moves in direction 951 in response to writing force pressure applied to tip 235. In one embodiment, applying writing force to tip 235 causes guide 215 to engage actuator 310 and activate writing pressure switch 55.

Figure 10:
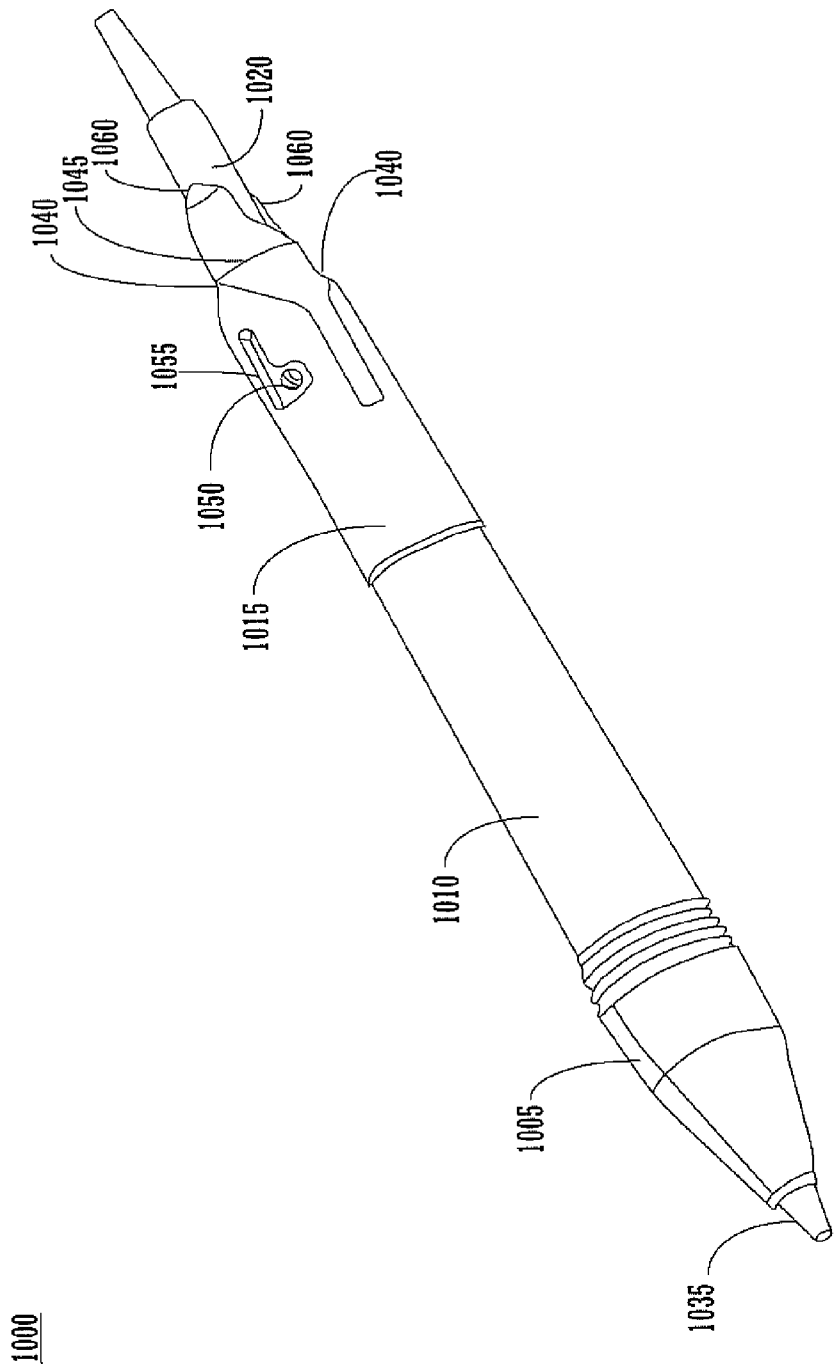
FIG. 10 shows an exemplary writing insert that can be utilized with embodiments of the present invention.

FIG. 10 shows an exemplary pen insert 1000 that can be utilized with embodiments of the present invention. Pen insert 1000 is comprised of a tip 1035, a tip housing 1005, a barrel 1010, a guide 1015, and a slide 1020. Slide 1020 is comprised of teeth 1060, and snap 1060. Guide 1015 is comprised of teeth 1040, rim 1045, and channel 1055. Pen insert 1000 is described in conjunction with FIGS. 11-14.

Figure 11:
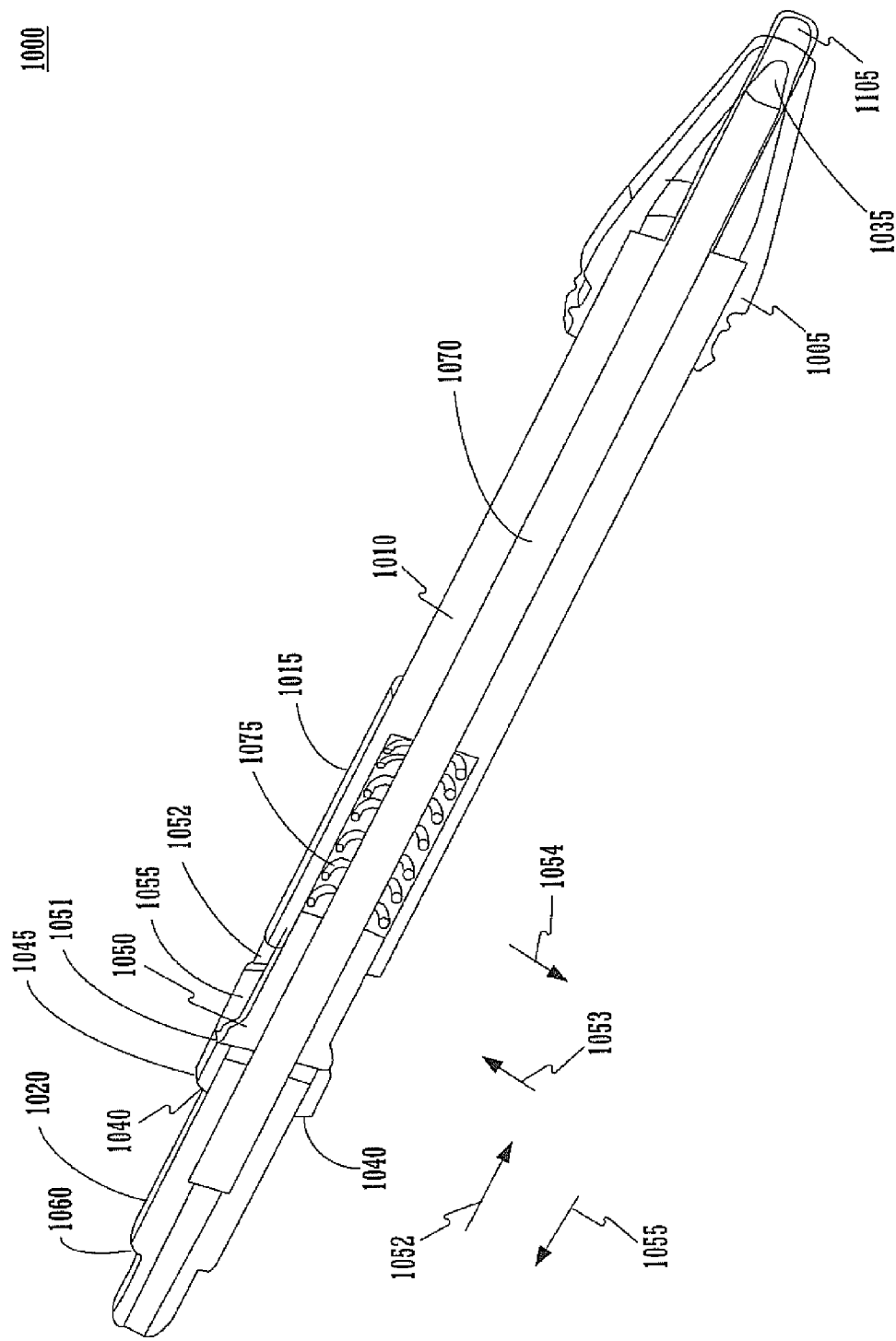
FIG. 11 shows a sectional view of an exemplary writing insert that can be utilized with embodiments of the present invention.

FIG. 11 shows a sectional view of an exemplary pen insert 1000 that can be utilized with embodiments of the present invention. Pen insert 1000 is comprised of slide 1020, guide 1015, barrel 1010, snap 1050, reservoir shaft 1070, spring 1075, tip housing 1005, and tip 1035. The exterior form factor of pen insert 1000 is very similar to that of writing insert 200 (FIG. 2). In one embodiment of the present invention, writing insert 200 and pen insert 1000 are both are exchangably couplable with writing insert holder 300 shown in FIG. 3.

Tip 1035 is a stylus tip or a writing tip, such as a ball point, roller ball, or other type of pen tip. Tip 1035 is shown retracted with in tip housing 1005, but can also be extended from tip housing 1005 for writing. Tip housing 1005 slidably and rotatably couples with barrel 1010. Tip housing 1005 also comprises threads or some other means which can be used to couple tip housing 1005 to a carrier, such as carrier 305 of writing insert holder 300 (FIG. 3). Tip 1035 is coupled with reservoir shaft 1070, which contains a supply of ink for pen tip 1035. Reservoir shaft 1070 is slidably and rotatably coupled within barrel 1010. Reservoir shaft 1070 is also fixedly coupled to slide 1020 by a means such as a press fit. In yet another embodiment of the present invention, tip 1035 is a non-marking stylus, and reservoir shaft 1070 is an empty shaft.

In another embodiment of the present invention, which also comprises a non-writing stylus mode, reservoir shaft 1070 and pen tip 1035 are slidably disposed within an optional thin hollow sleeve 1105 that protrudes from barrel 1010 and extends slightly out of tip 1035. In such an embodiment, the hollow sleeve 1105 can be utilized as a non-marking stylus when pen tip 1035 is retracted within sleeve 1105 (as shown in FIG. 11). While pen tip 1035 is retracted, writing pressure applied to sleeve 1105 is coupled from sleeve 1105, through barrel 1010, and into guide 1015. The transference of writing pressure causes guide 1015 to move in direction 1055. In an embodiment where writing insert 1000 is inserted into writing insert holder 300 (FIG. 3), writing force that moves guide 1015 in direction 1055 will cause rim 1045 to interface with actuator 310 and close switch 55 (see FIG. 3).

Guide 1015 comprises self-aligning teeth 1040 (similar to teeth 240 in FIG. 2) that interact with ramps, such as ramps 308 (FIG. 3), when pen insert 1000 is inserted into a carrier 305 (FIG. 3) to automatically align pen insert 1000 into the proper orientation. Although two self-aligning teeth 1040 are shown, more can be used in other embodiments. Guide 1015 also comprises a rim 1045 (similar to rim 245 of FIG. 2) for interacting with an actuator such as actuator 310 of FIG. 3. Guide 1015 is formed in a single piece with barrel 1010 and can be made of a material such as injection molded plastic. In another embodiment, guide 1015 and barrel 1010 can be manufactured as separate pieces and then fixedly coupled together by a means such as threaded ends. Guide 1015 also defines a channel 1055, which in this embodiment is L-shaped and has two stop points (1051 and 1052). In other embodiments, channel 1055 can have other shapes with more stop points.

Slide 1020 comprises snap 1050 and teeth 1060. Slide 1020 is slidably and rotatably coupled within guide 1015. Sliding and rotating of slide 1020 are limited and defined by the movement of snap 1050 within channel 1055 of guide 1015. Force exerted on slide 1020 in direction 1052 and direction 1053 slides and rotates snap 1050 from a first position 1051 to a second position 1052, within channel 1055. As slide 1020 and snap 1050 move in direction 1052, spring 1075 is compressed. Spring 1052 provides force to wedge slide 1055 in stop positions 1051 and 1052, within channel 1055. Spring 1075 also provides force to move snap 1050 from position 1052 to position 1051 when slide 1020 is used to rotate snap 1050 in direction 1054 from position 1052. When snap 1050 is engaged in position 1051, tip 1035 is retracted within tip housing 1005. Snap 1050 and guide 1015 work in concert to isolate spring force of spring 1075 within guide 1015. Teeth 1060, which are similar to teeth 260 in FIG. 2, are for interfacing with a mode selection button, such as mode selection button 325 of FIG. 3. By interfacing with a mode selection button, teeth 1060 receive force to slide and rotate slide 1020.

Figure 12:
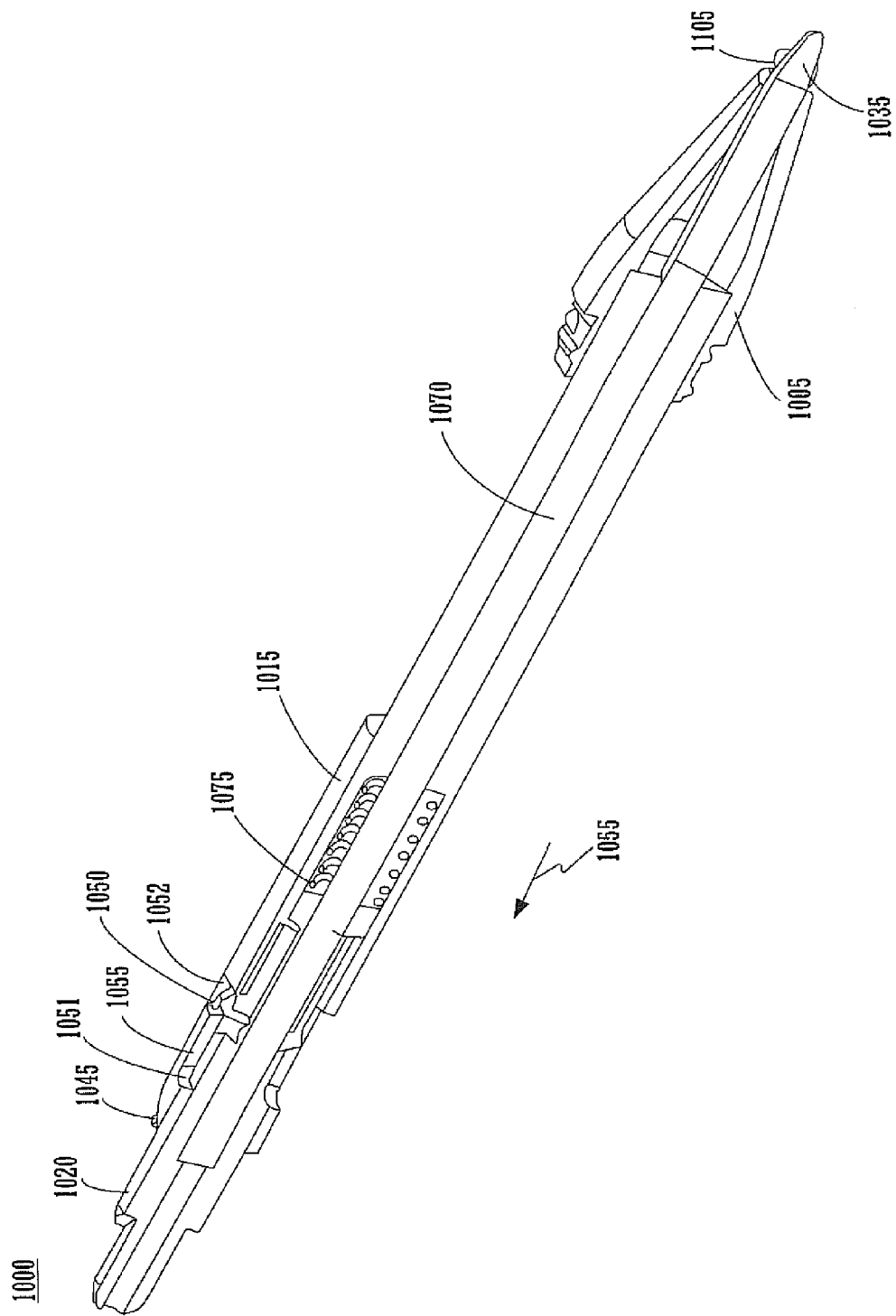
FIG. 12 shows a sectional view of an exemplary writing insert that can be utilized with embodiments of the present invention.

FIG. 12 shows a sectional view of an exemplary pen insert 1000 that can be utilized with embodiments of the present invention. FIG. 12 is analogous to FIG. 11 except that slide 1020 has been used to move snap 1050 from position 1051 to position 1052 in channel 1055. Spring 1075 is now compressed and tip 1035 is now extended from tip housing 1005 past the end of sleeve 1105, and can be used for marking and writing. Writing pressure on tip 1035 is transmitted up the shaft of reservoir shaft 1070 to guide 1015. The transference of writing pressure causes guide 1015 to move in direction 1055. In an embodiment where writing insert 1000 is inserted into writing insert holder 300 (FIG. 3), writing force that moves guide 1015 in direction 1055 will cause rim 1045 to interface with actuator 310 and close switch 55 (see FIG. 3). Such an arrangement is shown in and described in FIG. 14.

Figure 13:
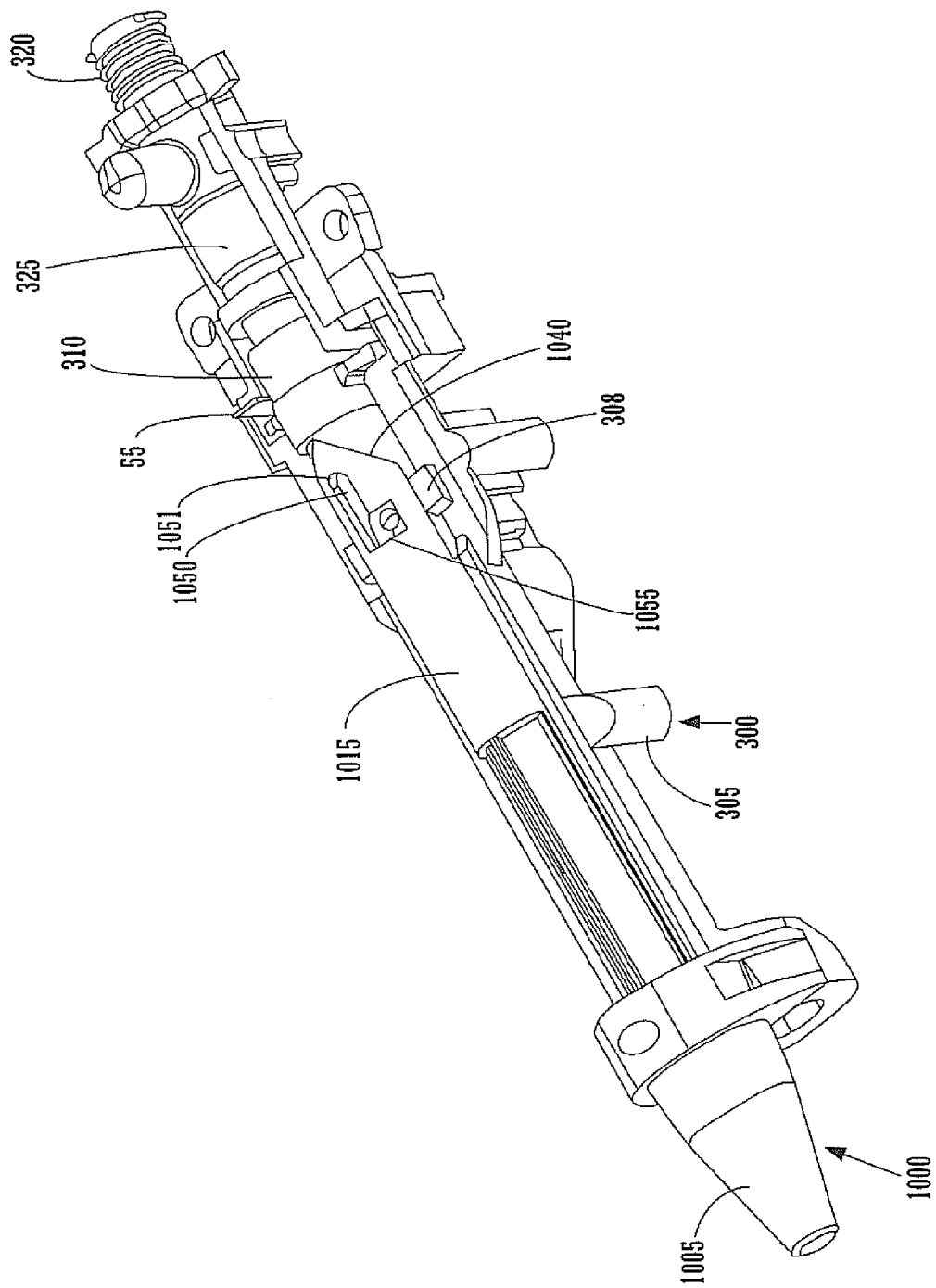
FIG. 13 shows an exemplary assembled writing insert holder coupled with an exemplary writing insert in accordance with an embodiment of the present invention.

FIG. 13 shows an exemplary assembled writing insert holder 300 coupled with an exemplary writing insert 1000 in accordance with an embodiment of the present invention. FIG. 13 differs from FIG. 6 in that writing insert 1000 has internal workings of an extendable and retractable ink pen instead of the mechanical pencil internal workings of writing insert 200. In the embodiment shown in FIG. 13, exemplary writing insert 1000 shares a similar external form factor and functionality with writing insert 200 for all parts that interface with writing insert holder 300 for selecting writing modes, sensing writing pressure, and orienting a writing insert. One difference is that tip 1035 (in a retracted position and not shown) of writing insert 1000 extends and retracts in conjunction with operation of mode button 325, whereas tip 235 of writing insert 200 merely changes modes of operation instead of extending and retracting.

In FIG. 13, writing insert holder 300 interfaces with writing insert 1000 in the same fashion as described in FIG. 6. For instance, in FIG. 13, the teeth 329 (FIG. 3) of selector button 325 are disposed within actuator 310. This arrangement allows force to be manually applied with mode selector button 325 through the center of pass through actuator 310 to a portion of a writing insert; such as the teeth 1060 (not visible, but the same as shown in FIG. 10) of slide 1020, without transferring any force to actuator 310 or switch 55. Mode selection button 325 can slide and rotate slide 1020 (not visible) into various positions that will then be locked-in by internal spring force from spring 1075 (FIG. 11) in writing insert 1000, thus acting to wedge snap 1050 into L-shaped guide 1055, when pressure from mode selection button 325 is removed.

This arrangement advantageously allows various modes of a writing insert such as the extendable and retractable pen shown in FIGS. 10 and 11 to be selected without interrupting or interfering with the functionality of switch 55, which is used to detect writing pressure. In FIG. 13, retracted mode has been selected by moving snap 1050 to position 1051 in L-shaped channel 1055 of guide 1015. Additionally, after manual force on mode selection button 325 is released, spring 320 pulls mode selection button 325 slightly away from slide 1020 (not visible), and into a selected stop point that snap 326 (FIG. 3) is aligned with in channel 327 (FIG. 3).

FIG. 13 also illustrates the interaction of ramps 1040 (one visible) with tabs 308, to cause writing insert 1000 to self-align when inserted in carrier 305 of writing insert 300. This aligning is the same as described in conjunction with FIG. 6. In the configuration shown, only two alignments are possible, 180 degrees apart from one another. In other embodiments with more ramps, more orientations are possible.

Figure 14:
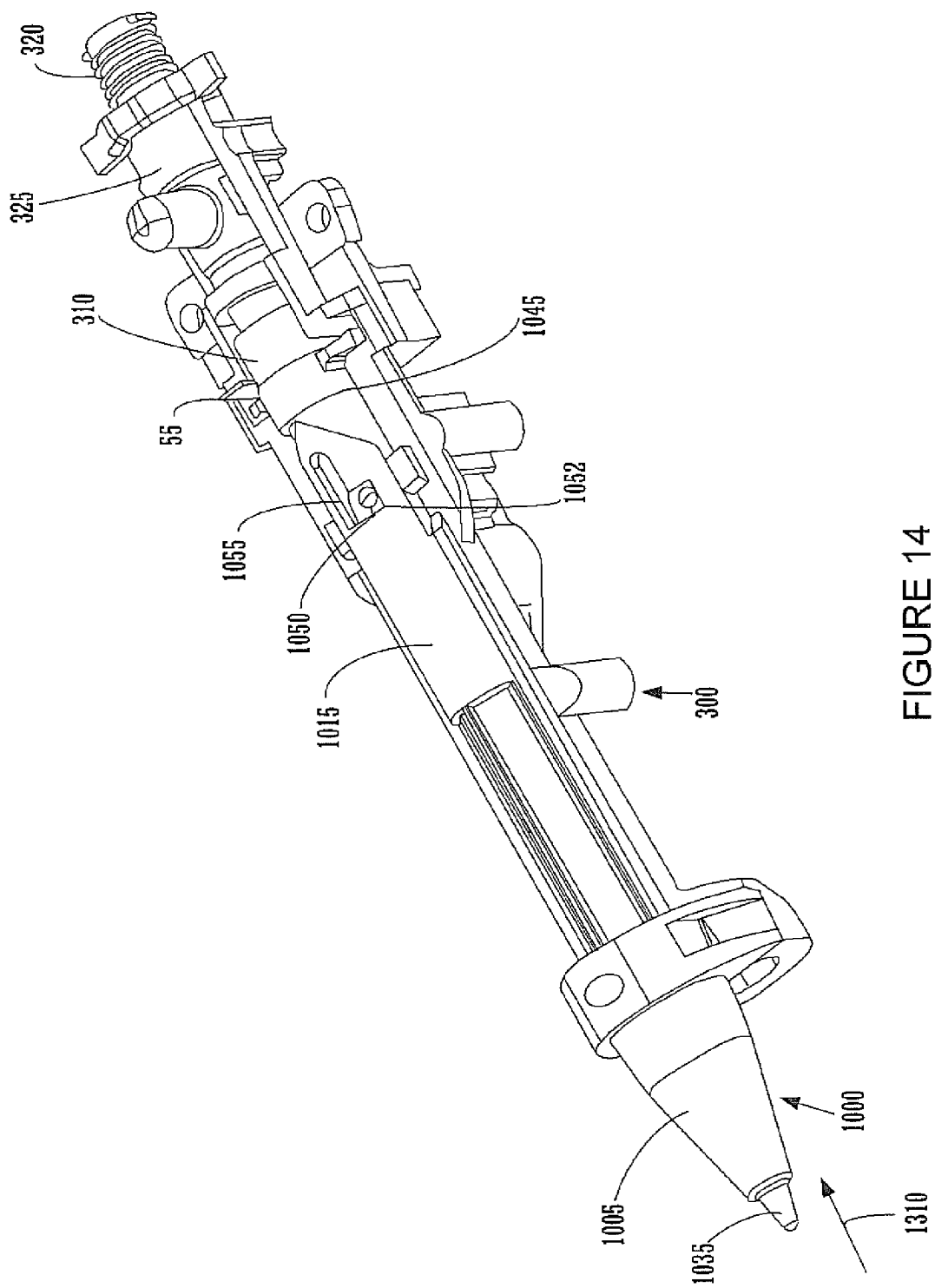
FIG. 14 shows an exemplary assembled writing insert holder coupled with an exemplary writing insert in accordance with an embodiment of the present invention.

FIG. 14 shows an exemplary assembled writing insert holder 300 coupled with an exemplary writing insert 1000 in accordance with an embodiment of the present invention. A difference between FIG. 13 and FIG. 14 is that snap 1050 of slide 1020 and mode button 325 are each locked in a second position. In the illustrated embodiment, the second position 1052 of snap 1050 causes the inner working of writing insert 1000 to extend tip 1035 from the retracted position of FIG. 13. The change in modes of mode button 325 also causes spring 320 to be compressed. As explained, changing modes of operation (from retracted to extended tip 1035) imparts no force or movement to switch 55 or actuator 310. This is because force from spring 320 and mode button 325 are isolated from actuator 310, and in addition, internal spring forces from writing insert 1000 are isolated from actuator 310 by snap 1050 which limits sliding motion of the internal components of writing insert 1000.

As can be seen, even though slide 1020 (not visible) and snap 1050 have changed positions inside guide 1015 (compared to FIG. 13), guide 1015 is still located in the same position relative to actuator 310 as it was in FIG. 13. With tip 1035 in an extended position, writing pressure on tip 1035 is detectable at switch 55 through actuator 310, in a similar manner as described in conjunction with FIG. 6.

For example, in the embodiment shown in FIG. 14, the interaction between rim 1045 of guide 1015 and actuator 310 in response to writing pressure on tip 1035 is appreciable. As pressure applied in direction 1310 to tip 1035 (for instance by writing), transferred force causes guide 1015 to slidably move in direction 1310 and interface with actuator 310 to close switch 55. Switch 55 is operable to detect writing pressure when mode button 325 and snap 1050 are locked in a second position 1052 (shown in FIG. 14) which causes tip 1035 to be extended. When writing pressure from tip 1035 is released, spring force from folded switch 55 forces switch 55 to an open position and pushes actuator 310 and guide 1055 back toward tip 1035. Tip 1035 is also pushed to its fully extended position (as shown in FIG. 14). No part of the interaction between tip 1035, actuator 310, and switch 55 is interfered with by the selection of writing modes via mode button 325. Further, switch 55 is only closed and activated in response to pressure (such as writing pressure) applied to tip 1035, at all other times, switch 55 is in an open position.

Various embodiments of the invention are thus described. While the present invention has been described in particular embodiments, it should be appreciated that the invention should not be construed as limited by such embodiments, but rather construed according to the below claims.

What is claimed is:

1. A pressure sensitive writing assembly, comprising;
   a carrier configured to receive a writing insert;
   a writing insert slidably coupled to said carrier;
   a switch coupled to said carrier, wherein a length of said switch is shortened responsive to application of a pressure thereto;
   an actuator coupled to said carrier and configured to activate said switch in response to pressure applied to said actuator by said writing insert;

a tip coupled to said writing insert and configured to slidably move a portion of said writing insert in response to pressure applied to said tip; and a mode selector slidably and rotatably coupled to said carrier and operable to select writing modes of said writing insert without interfering with the operation of said switch by isolating forces applied to said mode selector and said actuator.

2. The assembly of claim 1, wherein said carrier defines a channel for receiving said writing insert.

3. The assembly of claim 1, wherein said switch is an electrical switch.

4. The assembly of claim 1, wherein said writing insert is a pen insert and said writing modes are associated with said pen insert.

5. The assembly of claim 1, wherein said writing insert is a mechanical pencil insert and said mode selector is configured for selecting writing modes of said mechanical pencil insert.

6. The assembly of claim 3, wherein said electrical switch comprises a mylar type material.

7. The assembly of claim 3, wherein said switch senses varying levels of pressure applied to said switch.

8. The assembly of claim 3, wherein said switch is a two-position switch.

9. The assembly of claim 3, wherein said switch is a normally open switch.

* * * * *